(12) United States Patent
Kimmel et al.

(10) Patent No.: US 7,149,074 B2
(45) Date of Patent: Dec. 12, 2006

(54) METHODS OF MAKING A NIOBIUM METAL OXIDE

(75) Inventors: Jonathon L. Kimmel, Audubon, PA (US); Yongjian Qiu, Greenville, SC (US)

(73) Assignee: Cabot Corporation, Boston, MA (US)

( * ) Notice: Subject to any disclaimer, the term of this patent is extended or adjusted under 35 U.S.C. 154(b) by 921 days.

(21) Appl. No.: 10/121,198

(22) Filed: Apr. 12, 2002

(65) Prior Publication Data
US 2003/0026756 A1    Feb. 6, 2003

Related U.S. Application Data

(60) Provisional application No. 60/284,822, filed on Apr. 19, 2001.

(51) Int. Cl.
*H01G 9/08*    (2006.01)

(52) U.S. Cl. .................. 361/508; 361/528; 361/516; 29/25.03; 75/255

(58) Field of Classification Search ............... 361/508, 361/509, 516, 523, 528–529, 532; 29/25.03; 75/255, 245; 205/200
See application file for complete search history.

(56) References Cited

U.S. PATENT DOCUMENTS

| | | | |
|---|---|---|---|
| 3,962,715 A | 6/1976 | Raccah et al. ................. 357/2 |
| 4,118,727 A | 10/1978 | Laplante ....................... 357/10 |
| 4,668,501 A | 5/1987 | Shibuta et al. ............... 423/609 |
| 4,805,074 A * | 2/1989 | Harakawa et al. ........... 361/525 |
| 4,960,471 A | 10/1990 | Fife et al. .................... 148/20.3 |
| 4,964,906 A | 10/1990 | Fife .............................. 75/369 |
| 5,011,742 A | 4/1991 | Fife et al. .................... 428/558 |
| 5,032,377 A | 7/1991 | Rademachers et al. ..... 423/607 |
| 5,211,741 A * | 5/1993 | Fife ............................. 75/255 |
| 5,245,514 A * | 9/1993 | Fife et al. .................... 361/529 |
| 5,281,496 A | 1/1994 | Clarke ......................... 423/609 |
| 5,320,782 A | 6/1994 | Okuda et al. ................ 423/609 |
| 5,412,533 A * | 5/1995 | Murayama et al. .......... 361/528 |
| 5,688,730 A | 11/1997 | Bachelard et al. .......... 501/96.1 |
| 6,001,281 A | 12/1999 | Lessner et al. .............. 252/500 |
| 6,056,899 A | 5/2000 | Lessner et al. ........... 252/518.1 |
| 6,072,694 A | 6/2000 | Hahn et al. .................. 361/523 |
| 6,136,062 A | 10/2000 | Löffelholz et al. ............. 75/369 |
| 6,312,642 B1 | 11/2001 | Fife ............................. 419/30 |
| 6,322,912 B1 | 11/2001 | Fife ............................. 428/702 |
| 6,373,685 B1 | 4/2002 | Kimmel et al. .............. 361/508 |
| 6,391,275 B1 * | 5/2002 | Fife ........................... 423/594.8 |
| 6,402,066 B1 | 6/2002 | Habecker et al. ............. 241/21 |
| 6,416,730 B1 | 7/2002 | Fife ............................. 423/592 |

(Continued)

FOREIGN PATENT DOCUMENTS

DE    198 31 280 A1    1/2000

(Continued)

OTHER PUBLICATIONS

Georg Bauer, "The Oxides of Niobium," Zeitschrift fuer anorganische und allgerneine Chemie, vol. 248, Sep. 12, 1941, No. 1, pp. 1-31. (With Full English Translation).

(Continued)

*Primary Examiner*—Anthony Dinkins

(57) ABSTRACT

Methods to at least partially reduce a niobium oxide are described wherein the process includes heat treating the niobium oxide in the presence of a getter material and in an atmosphere which permits the transfer of oxygen atoms from the niobium oxide to the getter material, and for a sufficient time and at a sufficient temperature to form an oxygen reduced niobium oxide. Niobium oxides and/or suboxides are also described as well as capacitors containing anodes made from the niobium oxides and suboxides.

8 Claims, 20 Drawing Sheets

U.S. PATENT DOCUMENTS

| | | | |
|---|---|---|---|
| 6,462,934 | B1 * | 10/2002 | Kimmel et al. ............. 361/508 |
| 6,529,367 | B1 * | 3/2003 | Naito et al. ................. 361/524 |
| 6,639,787 | B1 * | 10/2003 | Kimmel et al. ............. 361/508 |
| 6,786,951 | B1 * | 9/2004 | He et al. ...................... 75/365 |
| 2002/0114722 | A1 | 8/2002 | Kimmel et al. ............... 419/45 |
| 2003/0170169 | A1 | 9/2003 | Omori et al. ............ 423/592.1 |

FOREIGN PATENT DOCUMENTS

| | | |
|---|---|---|
| EP | 0 634 761 A1 | 1/1995 |
| EP | 0 634 762 A1 | 1/1995 |
| GB | 1123015 | 8/1968 |
| WO | WO 98/19811 | 5/1998 |
| WO | WO 98/30348 | 7/1998 |
| WO | WO 00/12783 | 3/2000 |
| WO | WO 00/14139 | 3/2000 |
| WO | WO 00/14755 | 3/2000 |
| WO | WO 00/15555 | 3/2000 |
| WO | WO 00/15556 | 3/2000 |
| WO | WO 00/19469 | 4/2000 |
| WO | WO 00/28559 | 5/2000 |
| WO | WO 00/44068 | 7/2000 |
| WO | WO 00/45472 | 8/2000 |
| WO | WO 00/46818 | 8/2000 |

OTHER PUBLICATIONS

Hiraoka et al., "Electrochemical Measurement of the Standard Free Energies of Formation of Niobium Oxides," Transactions ISIJ, vol. 11, pp. 102-106 (1971).

Baba et al., "Preparation and Chlorination of $NbO_2$, NbO and NbC," Journal Mining and Mettallurgical Institute of Japan, vol. 82, No. 942, pp. 855-860 (1966).

Steeb, et al., "NIOB und Sauerstoff," Gmelin, Niob, Part B1, vol. 49, pp. 26-33 (1970) w/ partial English trans.

Mudrolyubov, "Production of tantalum capacitors in the C.I.S," Philadelphia meeting of the TIC, pp. 3-4 (1991).

Andersson, "Die Bedentung des Tantals in der Kondensatorindustrie," Erzmetall, vol. 48, No. 6/7, pp. 430-434 (1995).

Brauer et al., "Die Nitride des Niobs," Z. anorg. Allg. Chemie, vol. 270, pp. 160-178 (1952) w/ partial Engl. Trans.

Brauer, "Nitrides, Carbonitrides and Oxynitrides of Niobium," Journal of the less-Common Metals, vol. 2, pp. 131-137, (1960).

Schonberg, "Some Features of the Nb-N and Nb-N-O Systems," ACTA Chem. Scand., vol. 8, pp. 208-212 (1954).

Bauer, "The Oxides of Niobium," Zeitschrift fuer anorganische und allgemeine Chemie, vol. 248, No. 1, pp. 15-45 (1941) (English translation).

Gannon et al., "The Microstructure of Slightly Substoichiometric $NbO_2$," Journal of Solid State Chemistry, vol. 20, pp. 331-344 (1977).

Schafer, "Uber die Darstellung der Nioboxide und ihren Transport im Temperaturgefalle," Z. anorg. Allg. Chemie. vol. 317, pp. 321-333, (1962) w/ partial English translation.

Mifune, et al., "Niobium Solid Electrolytic Capacitors," National Technical Report 1, 147, pp. 1-14, (1963) (English translation).

Lapitskii, et al., "The formation of the lower oxides of niobium and tantalum in some reactions of reduction and oxidation," Zhurnal Neorganicheskoi Khimii, vol. II, No. 1, pp. 80-91, (1957).

Orlov et al., "Study of Oxygen Solubility in Niobium," Metally, No. 5, pp. 202-205 (1985).

Brauer et al., "Mikrokristallines NbO," p. 1462, from Handbuch Der Präparativen Anorganischen Chemie w/ partial English translation.

Mellor, J.W., "A Comprehensive Treatise on Inorganic and Theoretical Chemistry," vol. IX, pp. 895-896, 1947.

Notice of Opposition for EP 1115658 B1 with English Translation filed Apr. 2, 2004 by H.C. Stark GmbH.

Notice of Opposition for EP 1115658 B1 in English filed Apr. 8, 2004 by Strawman Limited.

* cited by examiner

US 7,149,074 B2

METHODS OF MAKING A NIOBIUM METAL OXIDE

This application claims the benefit under 35 U.S.C. §119 (e) of prior U.S. Provisional Patent Application No. 60/284,822 filed Apr. 19, 2001, which is incorporated in its entirety by reference herein.

BACKGROUND OF THE INVENTION

The present invention relates to niobium and oxides thereof and more particularly relates to niobium oxides and methods to at least partially reduce niobium oxide and further relates to oxygen reduced niobium.

With the ever increasing demand for capacitor materials such as tantalum, alternatives to tantalum have become an important priority in order to meet industry demands. Niobium is becoming one of the alternatives to tantalum but as the industry has realized, niobium is not a complete substitute for tantalum due to niobium not providing the same electrical properties. Accordingly, further developments in the niobium area continue today.

Another alternative to tantalum is niobium metal oxides that have been oxygen reduced, in other words, niobium suboxides such as NbO and the like. The oxygen reduced niobium oxides show considerable promise as providing an additional material that can be used in the formation of capacitor anodes. In order to further satisfy industry demands, several properties of the oxygen reduced niobium oxides should preferably be improved such as the crush strength of the oxygen reduced niobium oxides as well as efforts to reduce the amounts of contamination that occurs in the manufacturing of the oxygen reduced niobium oxides. In addition, acid leaching is commonly used to reduce the level of contamination occurring when niobium is milled to achieve particular particle sizes. This acid leaching complicates the manufacturing process and leads to the manufacturing process being more expensive.

In addition, the flow property of the oxygen reduced niobium oxides could be further improved to better satisfy industry standards.

Accordingly, there is a need to overcome one or more of the above-described disadvantages.

SUMMARY OF THE PRESENT INVENTION

A feature of the present invention is to provide oxygen reduced niobium oxides that have improved crush strength.

Another feature of the present invention is to provide a method to make oxygen reduced niobium oxides, which preferably avoid the step of acid leaching.

A further feature of the present invention is to provide methods of making oxygen reduced niobium oxides that avoid mixing getter material with a starting niobium oxide in dry form.

Furthermore, an additional feature of the present invention is to provide a method of making oxygen reduced niobium oxides such that the getter material and the starting niobium oxide are relatively close with respect to the particle distribution of each component.

Additional features and advantages of the present invention will be set forth in part in the description which follows, and in part will be apparent from the description, or may be learned by practice of the present invention. The objectives and other advantages of the present invention will be realized and attained by means of the elements and combinations particularly pointed out in the written description and appended claims.

To achieve these and other advantages and in accordance with the purposes of the present invention, as embodied and broadly described herein, the present invention relates to a method to at least partially reduce a niobium oxide which includes the steps of milling a niobium getter material in a mill, wherein the internal surfaces of the mill are niobium metal and wherein the grinding media used in the mill has niobium metal surfaces.

The present invention further relates to a method to at least partially reduce a niobium oxide, which includes the step of wet milling the niobium getter material and the starting niobium oxide separately in a mill. This process achieves a more uniform particle distribution for each individual component such that when the two components are combined, the particle distribution is relatively the same.

The present invention also relates to wet milling the niobium getter material and the starting niobium oxide together, which also achieves the above-described advantages.

The present invention also relates to milling (wet or dry) the oxygen reduced niobium oxide once formed.

The present invention also relates to an oxygen reduced niobium oxide having excellent crush strength, good flowability, low leakage, and/or low impurities.

The present invention further relates to a method to at least partially reduce a niobium oxide, which avoids an acid leaching process.

The present invention further relates to capacitor anodes containing the niobium oxides of the present invention and having other beneficial properties.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
FIGS. 1–11 are SEMs of various oxygen reduced niobium oxides of the present invention at various magnifications.

A preferred method of making oxygen reduced niobium oxides generally includes the steps of heat treating a starting niobium oxide in the presence of a getter material in an atmosphere which permits the transfer of oxygen atoms from the niobium oxide to the getter material for a sufficient time and at a sufficient temperature to form an oxygen reduced niobium oxide. In a more preferred embodiment, the getter material is niobium, such as niobium metal, and preferably the niobium getter material becomes part of the final product, namely the oxygen reduced niobium oxide(s).

The niobium oxide can be at least one oxide of niobium metal and/or alloys thereof. A specific example of a starting niobium oxide is $Nb_2O_5$.

The starting niobium oxide used in the present invention can be in any shape or size. Preferably, the niobium oxide is in the form of a powder or a plurality of particles. Examples of the type of powder that can be used include, but are not limited to, flaked, angular, nodular, and mixtures or variations thereof. Preferably, the niobium oxide is in the form of a powder that more effectively leads to the oxygen reduced niobium oxide. Examples of such preferred starting niobium oxide powders include those having mesh sizes of from about 60/100 to about 100/325 mesh and from about 60/100 to about 200/325 mesh. Another range of size is from −40 mesh to about −325 mesh.

The getter material for purposes of the present invention is any material capable of reducing the specific starting niobium oxide to the oxygen reduced niobium oxide. Preferably, the getter material comprises tantalum, niobium, or both. More preferably, the getter material is niobium. The niobium getter material for purposes of the present invention is any material containing niobium metal that can remove or reduce at least partially the oxygen in the niobium oxide. Thus, the niobium getter material can be an alloy or a material containing mixtures of niobium metal with other ingredients. Preferably, the niobium getter material is predominantly, if not exclusively, niobium metal. The purity of the niobium metal is not important but it is preferred that high purity niobium metal comprise the getter material to avoid the introduction of other impurities during the heat treating process. Accordingly, the niobium metal in the niobium getter material preferably has a purity of at least about 98% and more preferably at least about 99%. Further, it is preferred that impurities such as oxygen are not present or are present in amounts below about 100 ppm.

The getter material can be in any shape or size. For instance, the getter material can be in the form of a tray that contains the niobium oxide to be reduced or can be in a particle or powder size. Preferably, the getter materials are in the form of a powder in order to have the most efficient surface area for reducing the niobium oxide. The getter material, thus, can be flaked, angular, nodular, and mixtures or variations thereof.

In general, the materials, processes, and various operating parameters as described in U.S. patent application Ser. No. 09/154,452 filed Sep. 16, 1998; Ser. No. 09/347,990 filed Jul. 6, 1999; Ser. No. 09/396,615 filed Sep. 15, 1999; and Ser. No. 09/533,430 filed Mar. 23, 2000; and U.S. Provisional Patent Application No. 60/100,629 filed Sep. 16, 1998; No. 60/229,668 filed Sep. 1, 2000; and No. 60/246,042 filed Nov. 6, 2000 can be used in the present invention and all of these applications are incorporated herein in their entirety.

In making the niobium oxides of the present invention, and preferably NbO or variations thereof, hydrogen gas (or other carrier gases) is preferably used as the carrier wherein oxygen is transferred from the starting niobium material, namely $Nb_2O_5$ to Nb with the use of the $H_2$ gas as the carrier. The preferred reaction scheme is as follows:

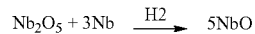

$$Nb_2O_5 + 3Nb \xrightarrow{H2} 5NbO$$

As can be seen, using a niobium metal as the getter material, the getter material along with the starting niobium oxide can all result into the final product which is preferably NbO. In more detail, there are typically two processes involved in preparing the niobium suboxides of the present invention. One process involves the preparation of the getter material and the other part of the process involves the use of the getter material along with the starting niobium oxide to form the niobium suboxide of the present invention. In preparing the getter material, which is preferably niobium powder, a niobium ingot is subjected to a hydriding process in order to harden the niobium metal for purposes of crushing the ingot into powder which is subsequently subjected to a screen in order to obtain a uniform particle distribution which is preferably from about 5 to about 300 microns in size. If needed, the powder can be subjected two or more times to the crusher in order to achieve the desired uniform particle distribution. Afterwards, the powder is then preferably subjected to milling in order to obtain the desired particle size which is from about 1 to about 5 microns in size. In this process, the milling of the niobium metal in order to form the niobium getter powder preferably occurs in a mill wherein all of the surfaces that come in contact with the niobium getter material are niobium. In other words, preferably all of the contact surfaces of the mill, arms, and grinding media used in the mill have a niobium surface. The niobium surface on the contact areas of the mill and grinding media can be accomplished by coating the grinding media and internal surfaces of the mill with niobium metal or plates of niobium metal can be placed (e.g., welded) in the mill. The grinding media, such as balls can be coated with niobium or can be completely made of niobium. By having all contact surfaces of the mill and grinding media made of niobium, the amount of contamination to the niobium getter material is significantly reduced and preferably reduced to such a level that acid leaching is not necessary and is preferably avoided. This is especially advantageous since acid leaching can be inconsistent and lead to varying levels of contamination from lot to lot. Preferably, the amount of niobium present on the contact surfaces of the mill and grinding media is of a sufficient level such that during the milling process, none of the non-niobium underlying surfaces come in contact with the niobium getter material. Preferably, the thickness of the niobium on the contact surfaces of the mill and grinding media is sufficient such that repeated milling can occur from lot to lot. Preferably, the milling of the niobium getter powder occurs in a wet mill which leads to a more uniform particle distribution size of the getter material. In wet milling, the liquid used can be aqueous or non-aqueous, such as water, alcohol, and the like. Preferably, the milling is sufficient to reduce the size to a range of from about 1 to about 10 microns, and more preferably, from about 1 micron to about 5 microns.

Similarly, in the present invention, the starting niobium oxide can be subjected to milling, e.g., wet milling, in order to achieve a more uniform particle distribution. Typically, the milling time required to achieve a similar particle distribution size of the starting niobium oxide as compared to the niobium getter material requires less time. Preferably, the milling, and more preferably the wet milling of the starting niobium oxide occurs in a similar milling set-up used with respect to the niobium getter powder. In other words, preferably, the contact surfaces of the mill, arms, and grinding media are preferably niobium metal to again avoid contamination of the starting niobium oxide. Preferably, the milling is sufficient to reduce the size of the starting niobium oxide to a size substantially similar to the getter material. In one sense, the starting niobium oxide is de-agglomerated by the milling.

In a preferred embodiment of the present invention, the milling and preferably wet milling of the niobium getter material and the starting niobium oxide are milled to the extent that the two components have similar particle distribution sizes. The advantage of having similar particle distribution sizes leads to an improved rate of forming the oxygen reduced niobium oxide. In other words, when the sizes of the two components are similar, the niobium getter material more uniformly accepts oxygen from the starting niobium oxide and similarly, the starting niobium oxide more readily is reduced. Thus, the final product, which is the oxygen reduced niobium oxide, is more uniform and includes as part of the final product, the niobium getter material which has been transformed as well to the oxygen reduced niobium oxides. This reaction rate is also increased due to the shorter distance for the oxygen to defuse out of the starting niobium oxide and to defuse into the niobium getter material. This shorter distance also minimizes oxygen gradients within the final product resulting in a more stable product. By improving the reaction kinetics, the processing temperature for the reaction may be decreased to a temperature that is more favorable for the formation of preferred oxygen reduced niobium oxides, such as NbO.

In a preferred embodiment of the present invention, the milling, and more preferably, the wet milling of the niobium getter material and the starting niobium oxide occur together. In more detail, the wet milling of the niobium getter material and the starting niobium oxide can occur simultaneously wherein both materials are introduced in a mill, as described above, and uniformly mixed together in the mill for purposes of achieving a uniform mixture as well as uniform particle size. However, since the amount of time necessary to achieve the same particle size varies between the niobium getter material and the starting niobium oxide, preferably, the niobium getter material is introduced first and milled alone for a certain time, such as a particular targeted size of, for instance, from about 1 to about 10 microns, and then the starting niobium oxide is introduced into the same mill and the milling is continued with both components present until a targeted size of both particles is obtained which is preferably from about 1 micron to about 10 microns, and more preferably, from about 1 to about 5 microns. In a preferred embodiment, the niobium getter material achieves a particle size of about 2 microns and the starting niobium oxide achieves a particle size of about 4 microns. In a preferred embodiment, the milling occurs in an Attritor mill such as a 1 S mill which is operated at about 300 rpms. When the milling is completed, the mixture can then be subjected to the heat treatment as described in the previous applications incorporated herein.

This niobium getter powder is then mixed with or blended with the starting niobium oxide material, which is preferably $Nb_2O_5$, and subjected to a hydrogen heat treatment which preferably occurs at a temperature of from about 800 to about 1,200° C. with the hydrogen pressure being from about 50 Torr to about 900 Torr. Preferably, the starting niobium oxide is −325 mesh. Preferably, the heat treatment occurs for a sufficient time to achieve the reaction set forth above which is the full conversion of the getter material and the starting metal oxide to the final product which is preferably NbO. Thus, in this process, the getter material as well as the staring metal oxide, all become the final product.

The milling of the niobium getter material, the starting niobium oxide, and/or the final product can occur sequentially by milling with varying ball diameters. In other words, the milling of the getter material, for instance, can occur in stages in different mills or in the same mill, but in each instance using ball diameters that have a lower ball diameter with each mill step. This permits a more uniform milling of the component(s) since smaller diameter balls permits a more uniform milling. This staged milling can be applied to any of the milling of the components used in the present invention and results in reducing the overall milling time to achieve the target size. With the reduction in milling time, the length of time that the material is exposed to possible contamination is also reduced. Also, the overall cost of production is also reduced. An example of a suitable ratio for wet milling is 800 grams of powder to 300 ml of water. The remaining volume in the mill is taken up by milling media. Dry milling can be used in lieu of wet milling, and generally an inert atmosphere should be used.

The heat treating that the starting niobium oxide is subjected to can be conducted in any heat treatment device or furnace commonly used in the heat treatment of metals, such as niobium and tantalum. The heat treatment of the niobium oxide in the presence of the getter material is at a sufficient temperature and for a sufficient time to form an oxygen reduced niobium oxide. The temperature and time of the heat treatment can be dependent on a variety of factors such as the amount of reduction of the niobium oxide, the amount of the getter material, and the type of getter material as well as the type of starting niobium oxide. Generally, the heat treatment of the niobium oxide will be at a temperature of from less than or about 800° C. to about 1900° C. and more preferably from about 1000° C. to about 1400° C., and most preferably from about 1200° C. to about 1250° C. In more detail, when the niobium oxide is a niobium containing oxide, the heat treatment temperatures will be from about 1000° C. to about 1300° C., and more preferably from about 1200° C. to about 1250° C. for a time of from about 5 minutes to about 100 minutes, and more preferably from about 30 minutes to about 60 minutes. Routine testing in view of the present application will permit one skilled in the art to readily control the times and temperatures of the heat treatment in order to obtain the proper or desired reduction of the niobium oxide.

The heat treatment occurs in an atmosphere which permits the transfer of oxygen atoms from the niobium oxide to the getter material. The heat treatment preferably occurs in a hydrogen containing atmosphere where is preferably just hydrogen. Other gases can also be present with the hydrogen, such as inert gases, so long as the other gases do not react with the hydrogen. Preferably, the hydrogen atmosphere is present during the heat treatment at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the niobium oxide.

During the heat treatment process, a constant heat treatment temperature can be used during the entire heat treating process or variations in temperature or temperature steps can be used. For instance, hydrogen can be initially admitted at 1000° C. followed by increasing the temperature to 1250° C. for 30 minutes followed by reducing the temperature to 1000° C. and held there until removal of the $H_2$ gas. After the $H_2$ or other atmosphere is removed, the furnace temperature can be dropped. Variations of these steps can be used to suit any preferences of the industry.

Once the heat treatment is complete and the desired oxygen reduced niobium oxide is obtained, the powder can then be pressed into an anode using conventional methods of forming anodes from valve metals. In the present invention, the oxygen reduced niobium oxide has significantly improved flow properties as well as crush strength and further has low impurities which all lead to beneficial capacitor anode properties, such as an extremely low leakage.

In more detail, the crush strength of the oxygen reduced niobium oxide preferably has a ten fold increase compared to the oxygen reduced niobium oxides formed using the previous methods of making the oxygen reduced niobium oxides, such as those described in U.S. patent application Ser. No. 09/154,452.

The crush strength and other properties are preferably achieved by taking the oxygen reduced niobium oxide formed from the above-described preferred process of the present invention and combining it with a sufficient amount of binder in order to form the capacitor anode. Preferably, the amount of binder used is from about 1% to about 5% by weight based on the weight of the capacitor anode. Suitable binders include, but are not limited to, PEG and Q-Pak. Other suitable binders are described in one of the earlier referenced applications which are incorporated in their entireties by reference herein.

With respect to the anodes formed from the niobium oxides of the present invention, preferably, the niobium oxide powder is mixed with a binder and/or lubricant solution in an amount sufficient to be able to form the niobium oxide powder into an anode when pressed. Preferably, the amount of the binder and/or lubricant in the powder ranges from about 1 to about 20 wt %, based on the wt % of the combined ingredients. After mixing the niobium oxide powder with the binder and/or lubricant solution, the solvent that may be present as part of the binder/lubricant solution is removed by evaporation or other drying techniques. Once the solvent, if present, is removed, the niobium oxide powder is then pressed into the shape of an anode, preferably with a tantalum, niobium, or other conductive wire embedded in the anode. While a variety of press densities can be used, preferably, the pressed density is from about 2.5 to about 4.5 g/cc. Once pressed into the anode, a de-binding or de-lube step occurs to remove the binder and/or lubricant present in the pressed anode. The removal of the binder and/or lubricant can occur a number of ways including putting the anode in a vacuum furnace at temperatures, for instance, of from about 250° C. to about 1200° C. to thermally decompose the binder and/or lubricant. The binder and/or lubricant can also be removed by other steps, such as repeated washings in appropriate solvents to dissolve and/or solubilize or otherwise remove the binder and/or lubricant that may be present. Once the de-binding/de-lube step is accomplished, the anode is then sintered in a vacuum or under inert atmosphere at appropriate sintering temperatures, such as from about 900° C. to about 1900° C. The finished anode then preferably has reasonable body and/or wire pull strength as well as low carbon residue. The anodes of the present invention, which use the niobium oxides of the present invention, have numerous advantages over tantalum and/or niobium powders which are formed into anodes. Many organic binders and/or lubricants, which are used to improve press performance in the formation of an anode, lead to high carbon residues that are present after de-binding or de-lubing and sintering. The full removal of the carbon residue can be extremely difficult since carbon forms carbides with metals. The presence of carbon/carbides leads to the formation of defective dielectrics and thus an undesirable product. With the anodes of the present invention, the micro-environment of the anode is oxygen-rich. Thus, when the anode is sintered at high temperature, carbon residue in the anodes can evaporate as carbon monoxide after reacting with oxygen. Thus, the anodes of the present invention have a "self-cleaning" property that is quite different from other anodes formed from tantalum or niobium. Accordingly, the anodes of the present invention have a high tolerance of organic impurities during processing and handling and have the ability to use a wide range of hydrocarbon containing binders and/or lubricants for improved processability including improved powder flow, improved anode green strength, and the like. Accordingly, the binders and/or lubricants that can be used in the present invention include organic binders and organic lubricants as well as binders and lubricants that contain high amounts of hydrocarbons. Examples of suitable binders that can be used in the formation of the pressed anodes of the present invention, include, but are not limited to, poly(propylene carbonates) such as QPAC-40 available from PAC Polymers, Inc., Greenville, Del.; alkyd resin solutions, such as GLYPTAL 1202 available from Glyptal Inc., Chelsea, Mass.; polyethylene glycols, such as CARBOWAX, available from Union Carbide, Houston, Tex.; polyvinyl alcohols, stearic acids, and the like. The procedures and additional examples of binders and/or lubricants set forth in Publication Nos. WO 98/30348; WO 00/45472; WO 00/44068; WO 00/28559; WO 00/46818; WO 00/19469; WO 00/14755; WO 00/14139; and WO 00/12783; and U.S. Pat. Nos. 6,072,694; 6,056,899; and 6,001,281, all of which are incorporated in their entirety by reference herein, can be used in the present invention.

The flow properties of the oxygen reduced niobium oxides of the present invention are preferably improved as well as the impurity levels of the oxygen reduced niobium oxides, as shown in the examples.

An additional embodiment of the present invention involves milling of the oxygen reduced niobium oxide, such as NbO. In more detail, after the heat treatment and formation of the oxygen reduced niobium oxides, the final product can then be milled, such as by wet milling, in order to achieve a uniform particle size distribution. Preferably, the particle size can range from about 1 micron to about 10 microns and more preferably from about 1 micron to about 5 microns. The milling of the final product can occur in combination with the above-mentioned milling steps. However, if the milling of the starting niobium oxide and the niobium getter material occurs prior to the heat treatment, the milling of the final product can be avoided. If the starting niobium oxide is not milled but simply mixed with the niobium getter material, for instance, then it is preferred that the resulting oxygen reduced niobium oxides are milled afterwards once the final product is formed. As shown in the Examples, this post-milling of the final product leads to significantly improved crush strength properties.

Once the oxygen reduced niobium oxides are formed, as indicated above, the particles can be mixed with a binder in the amounts indicated above and then compacted. The compacted particles can then be crushed sufficiently to form a particle distribution of from about 100 microns to about 500 microns and more preferably from about 100 microns to about 300 microns. These particles can then be pressed into anodes and sintered for anode production using conventional techniques known to those skilled in the art. As shown in the Examples, the crush strength of the oxygen reduced niobium powders of the present invention are significantly improved compared to previous oxygen reduced niobium oxides and further have significantly lower leakage.

The oxygen reduced niobium oxides can also contain levels of nitrogen, e.g., from about 100 ppm to about 80,000 ppm $N_2$ or to about 130,000 ppm $N_2$. Suitable ranges includes from about 31,000 ppm $N_2$ to about 130,000 ppm $N_2$ and from about 50,000 ppm $N_2$ to about 80,000 $N_2$.

The oxygen reduced niobium oxide is any niobium oxide which has a lower oxygen content in the metal oxide compared to the starting niobium oxide. Typical reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1:less than 2.5, and preferably 1:2 and more preferably 1:1.1, 1:1, or 1:0.7. Put another way, the reduced niobium oxide preferably has the formula $Nb_xO_y$, wherein Nb is niobium, x is 2 or less, and y is less than 2.5x. More preferably x is 1 and y is less than 2, such as 1.1, 1.0, 0.7, and the like.

The starting niobium oxides can be prepared by calcining at 1000° C. until removal of any volatile components. The oxides can be sized by screening. Preheat treatment of the niobium oxides can be used to create controlled porosity in the oxide particles.

The reduced niobium oxides of the present invention also preferably have a microporous surface and preferably have a sponge-like structure, wherein the primary particles are preferably 1 micron or less. The SEMs further depict the type of preferred reduced niobium oxide of the present invention. As can be seen in these microphotographs, the reduced niobium oxides of the present invention can have high specific surface area, and a porous structure with approximately 50% porosity. Further, the reduced niobium oxides of the present invention can be characterized as having a preferred specific surface area of from about 0.5 to about 10.0 $m^2/g$, more preferably from about 0.5 to 2.0 $m^2/g$, and even more preferably from about 1.0 to about 1.5 $m^2/g$. The preferred apparent density of the powder of the niobium oxides is less than about 2.0 g/cc, more preferably, less than 1.5 g/cc and more preferably, from about 0.5 to about 1.5 g/cc.

The various oxygen reduced niobium oxides of the present invention can be further characterized by the electrical properties resulting from the formation of a capacitor anode using the oxygen reduced niobium oxides of the present invention. In general, the oxygen reduced niobium oxides of the present invention can be tested for electrical properties by pressing powders of the oxygen reduced niobium oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced niobium oxides of the present invention. Anodes can be made from the powdered form of the reduced oxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the oxygen reduced niobium oxides of the present invention can have a capacitance of from about 1,000 CV/g or lower to about 300,000 CV/g or more, and other ranges of capacitance can be from about 20,000 CV/g to about 300,000 CV/g or from about 62,000 CV/g to about 200,000 CV/g and preferably from about 60,000 to 150,000 CV/g. In forming the capacitor anodes of the present invention, a sintering temperature can be used which will permit the formation of a capacitor anode having the desired properties. The sintering temperature will be based on the oxygen reduced niobium oxide used. Preferably, the sintering temperature is from about 1200° C. to about 1750° C. and more preferably from about 1200° C. to about 1400° C. and most preferably from about 1250° C. to about 1350° C. when the oxygen reduced niobium oxide is an oxygen reduced niobium oxide.

The sintering temperature in the formation of a capacitor anode of the present invention can be accomplished at a variety of temperatures. For instance, the sintering temperature can be conducted at about 800° C. or lower to about 1750° C. or higher. When lower temperatures are used such as on the order of from about 900° C. or lower to about 1100° C., sintering can occur for any sufficient time to result in a capacitor anode that provides capacitance. When lowering sintering temperatures are used to form the capacitor anodes of the present invention, the sintering time is preferably longer than conventional times used for forming capacitor anodes in general. For instance, the sintering times can be from about 1 hour to about 10 hours or more (e.g., 1 or more days). As a more specific example, sintering times can be from about 1 hour to about 5 hours or from about 2 hours to about 4 hours. These long sintering times at low sintering temperatures preferably results in an acceptable capacitance for the capacitor anode as well as a low DC leakage such as below about 0.5 nanoamperes/CV. In addition, less shrinkage occurs at these lower sintering temperatures that preferably yield a more desirable pore structure. For example, with lower sintering temperatures using the anodes of the present invention, the number of pores is greater and the diameter of these pores is larger which results in very beneficial properties in using these capacitor anodes in electrical applications. For example, these improved properties with respect to the number of pores and size of the pores further results in achieving maximum capacitance retention through the capacitor manufacturing process. Accordingly, when the various preferred embodiments of the present invention are used, such as the milling options described above as well as using lower sintering temperatures, a whole host of improved properties are achieved with respect to the powder and the resulting capacitor anode as described herein. Generally, the lower the sintering temperature, the longer the sintering time for purposes of achieving the desirable properties such as capacitance, low DC leakage, and other properties. Thus, if the sintering temperature is more on the order of about 800° C. the sintering time will be much longer compared to a sintering temperature of 1100° C. or more. As stated above and shown in the examples, the sintering time can be a variety of different times pending upon the desired properties of the resulting capacitor anode.

The anodes formed from the niobium oxides of the present invention are preferably formed at a voltage of about 35 volts and preferably from about 6 to about 70 volts. When an oxygen reduced niobium oxide is used, preferably, the forming voltages are from about 6 to about 50 volts, and more preferably from about 10 to about 40 volts. Other high formation voltages can be used such as from about 70 volts to about 130 volts. The DC leakage achieved by the niobium oxides of the present invention have provided excellent low leakage at high formation voltages. This low leakage is significantly better than capacitors formed with Nb powder as can be seen in, for instance, FIG. 12. Anodes of the reduced niobium oxides can be prepared by fabricating a pellet of $Nb_2O_5$ with a lead wire followed by sintering in $H_2$ atmosphere or other suitable atmosphere in the proximity of a getter material just as with powdered oxides. In this embodiment, the anode article produced can be produced directly, e.g., forming the oxygen reduced valve metal oxide and an anode at the same time. Also, the anodes formed from the oxygen reduced niobium oxides of the present invention preferably have a DC leakage of less than about 5.0 nA/CV. In an embodiment of the present invention, the anodes formed from some of the oxygen reduced niobium oxides of the present invention have a DC leakage of from about 5.0 nA/CV to about 0.50 nA/CV.

The present invention also relates to a capacitor in accordance with the present invention having a niobium oxide film on the surface of the capacitor. Preferably, the film is a niobium pentoxide film. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

Preferably, the niobium suboxide of the present invention is a NbO or oxygen depleted NbO or an aggregate or agglomerate which contains NbO and niobium metal or niobium metal with a rich oxygen content. Unlike NbO, NbO2 is undesirable due to its resistive nature, whereas NbO is very conductive. Accordingly, capacitor anodes which are formed from NbO or oxygen depleted NbO or mixture of NbO with niobium metal are desirable and preferred for purposes of the present invention.

Figure 13:
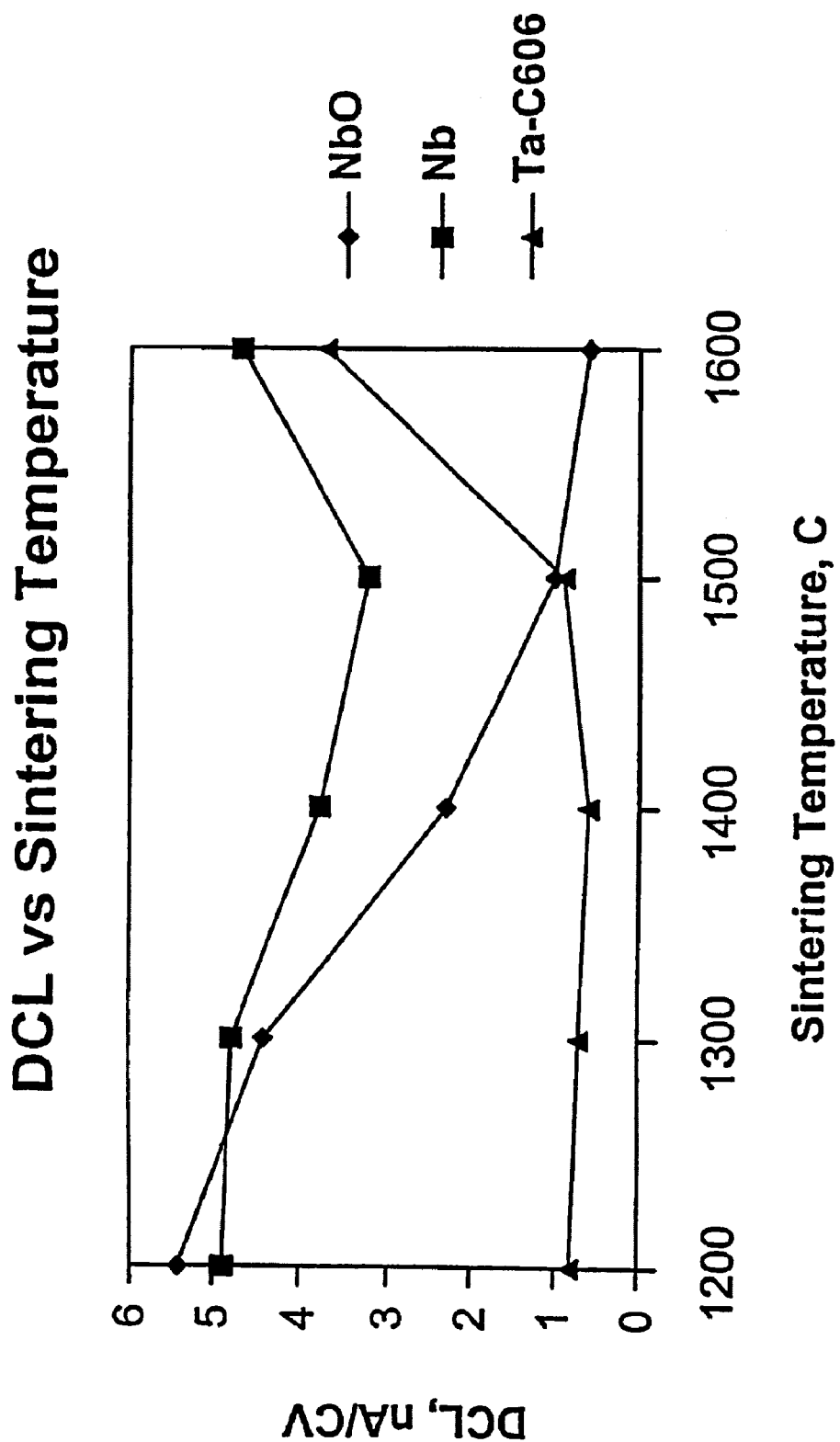
FIGS. 13 and 14 are graphs showing a DCL and capacitance comparison of an anode containing niobium oxide compared to anodes containing niobium flake and tantalum.

The sintering properties of the anode formed from the niobium suboxides of the present invention show that the present invention provides an anode which has DC leakage capability comparable to tantalum when sintered at high temperatures but, unlike other metals, is less prone to capacitance lost during sintering. These favorable properties are set forth in FIGS. 13 and 14 which show a comparison of the preferred niobium oxide of the present invention compared to an anode formed from niobium flake and an anode formed from tantalum. As can be seen in FIG. 13, the anode formed from the niobium oxide of the present invention showed satisfactory DC leakage when the anode was sintered at temperatures of from about 1200 to 1600° C. or higher whereas an anode formed from niobium metal showed a higher DC leakage for sintering temperatures of from about 1200 to 1600° C. with no significant drop in DC leakage at high temperatures, such as 1400 to 1600° C.

Figure 14:
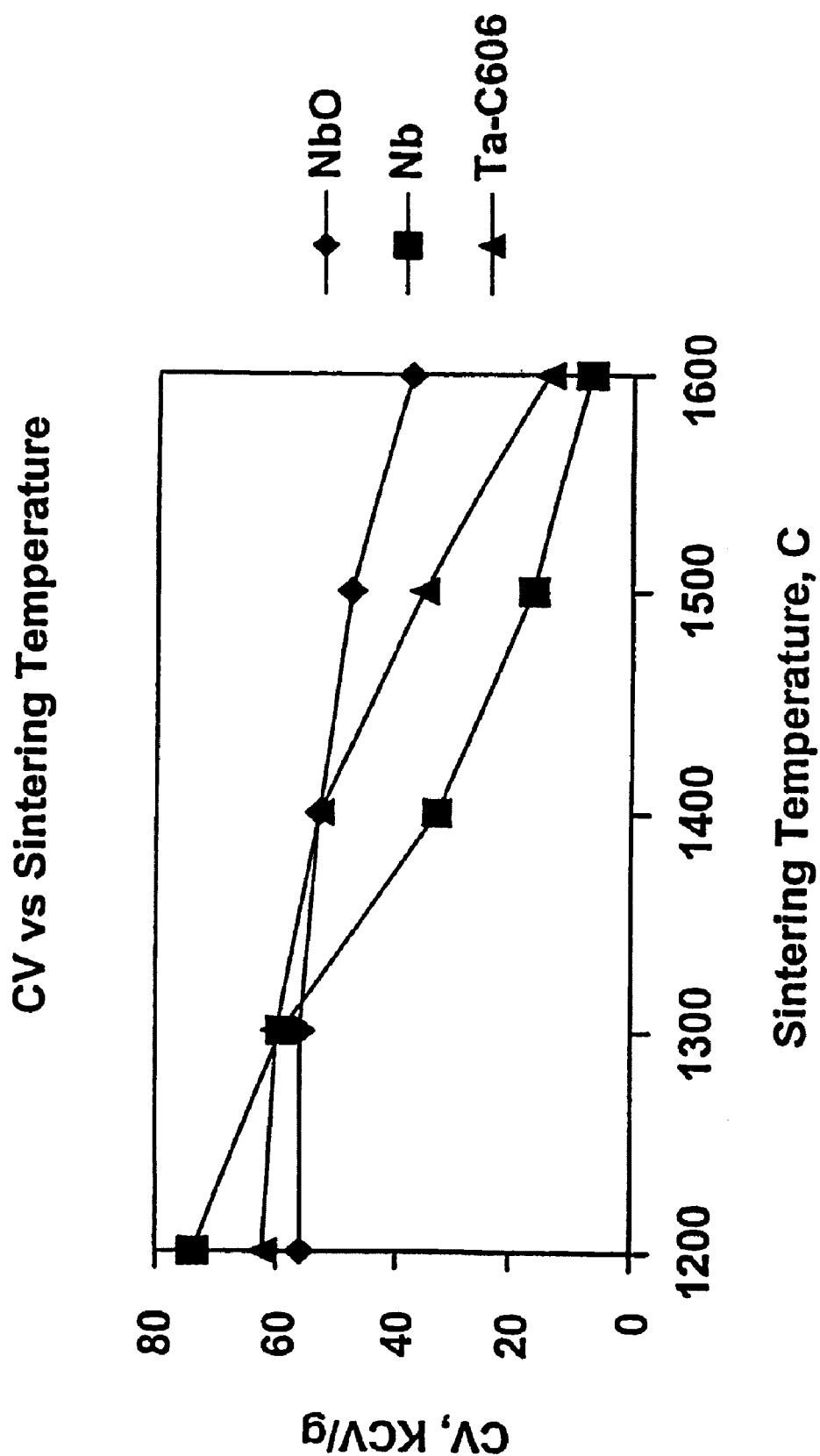

Also, as shown in FIG. 14, when an anode made from niobium metal was sintered at temperatures of from 1200 to 1600° C. and then capacitance tested with a wet anode, the capacitance steadily declined as the sintering temperature increased to the point where the capacitance was about 10,000 CV/g at a sintering temperature of about 1600° C. Unlike niobium metal, when an anode made from the niobium suboxides of the present invention was tested, the capacitance was fairly steady when sintered at a variety of temperatures of from 1200 to about 1600° C. There was only a slight drop at these higher temperatures. This is even different from an anode made from tantalum which showed a significant drop after sintering at 1400° C. Accordingly, the anodes formed from the niobium suboxides of the present invention showed excellent resistance to DC leakage as well as an ability to resist capacitance loss at higher sintering temperatures.

The anodes formed from the niobium suboxides of the present invention further showed an ability to have a low DC leakage even with high formation voltages. In addition, the capacitance of the anodes formed from the niobium suboxides of the present invention showed high capacitance for a variety of formation voltages such as from 20 to 60 volts.

Figure 3:
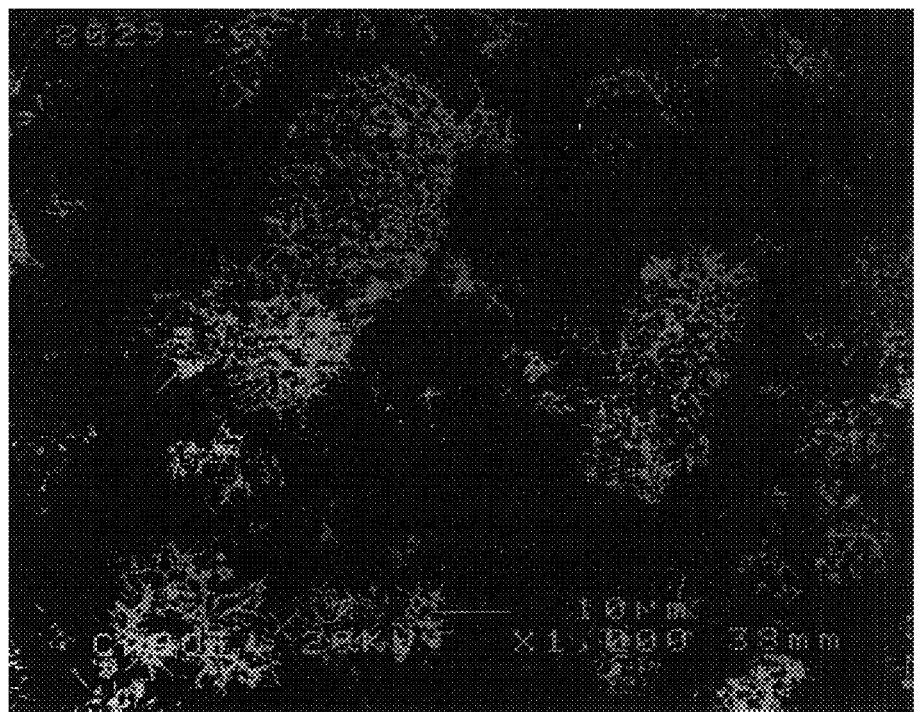
Figure 15:
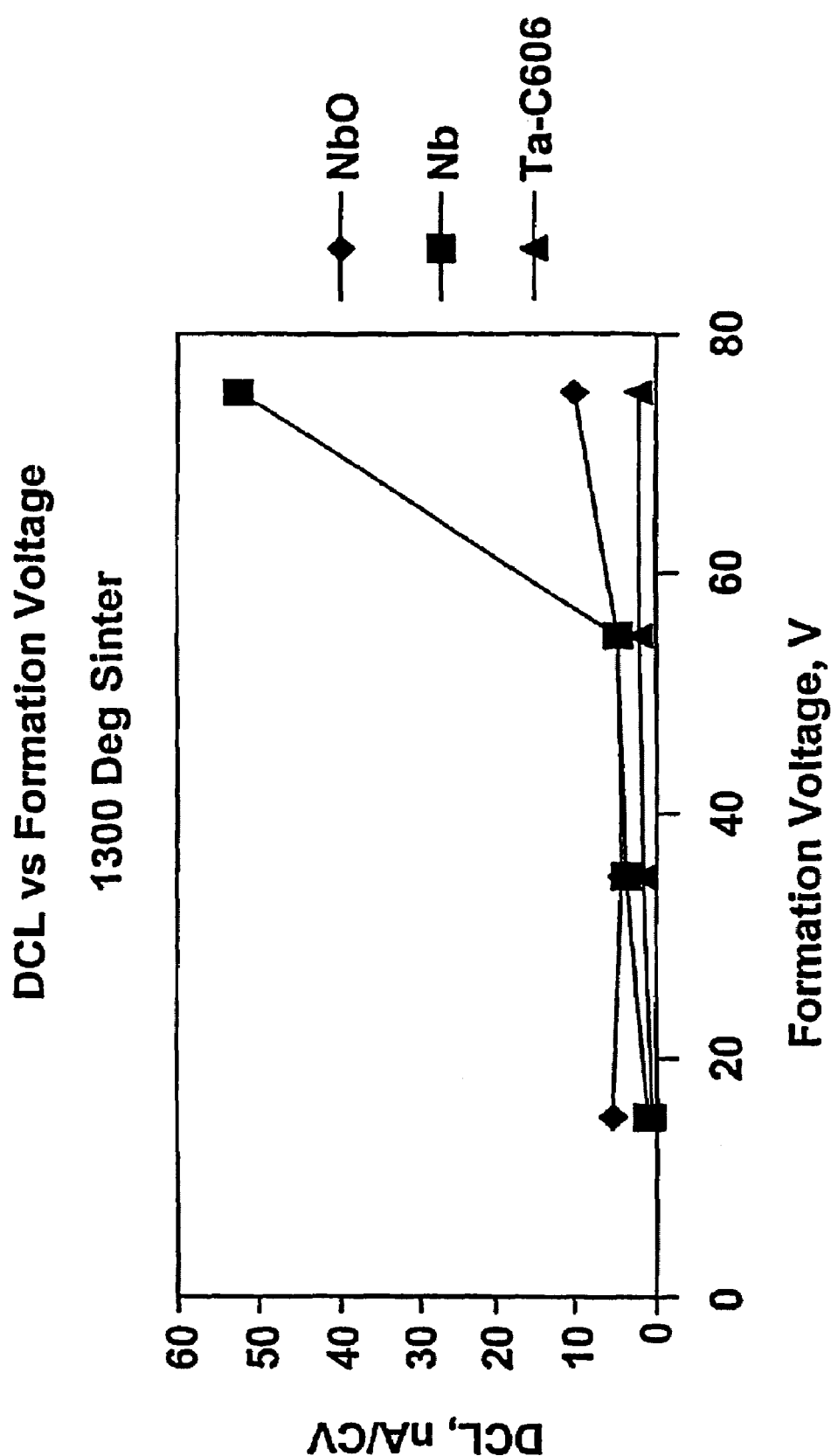
FIG. 15 is a graph showing DC leakage for anodes formed from niobium suboxides of the present invention.
Figure 16:
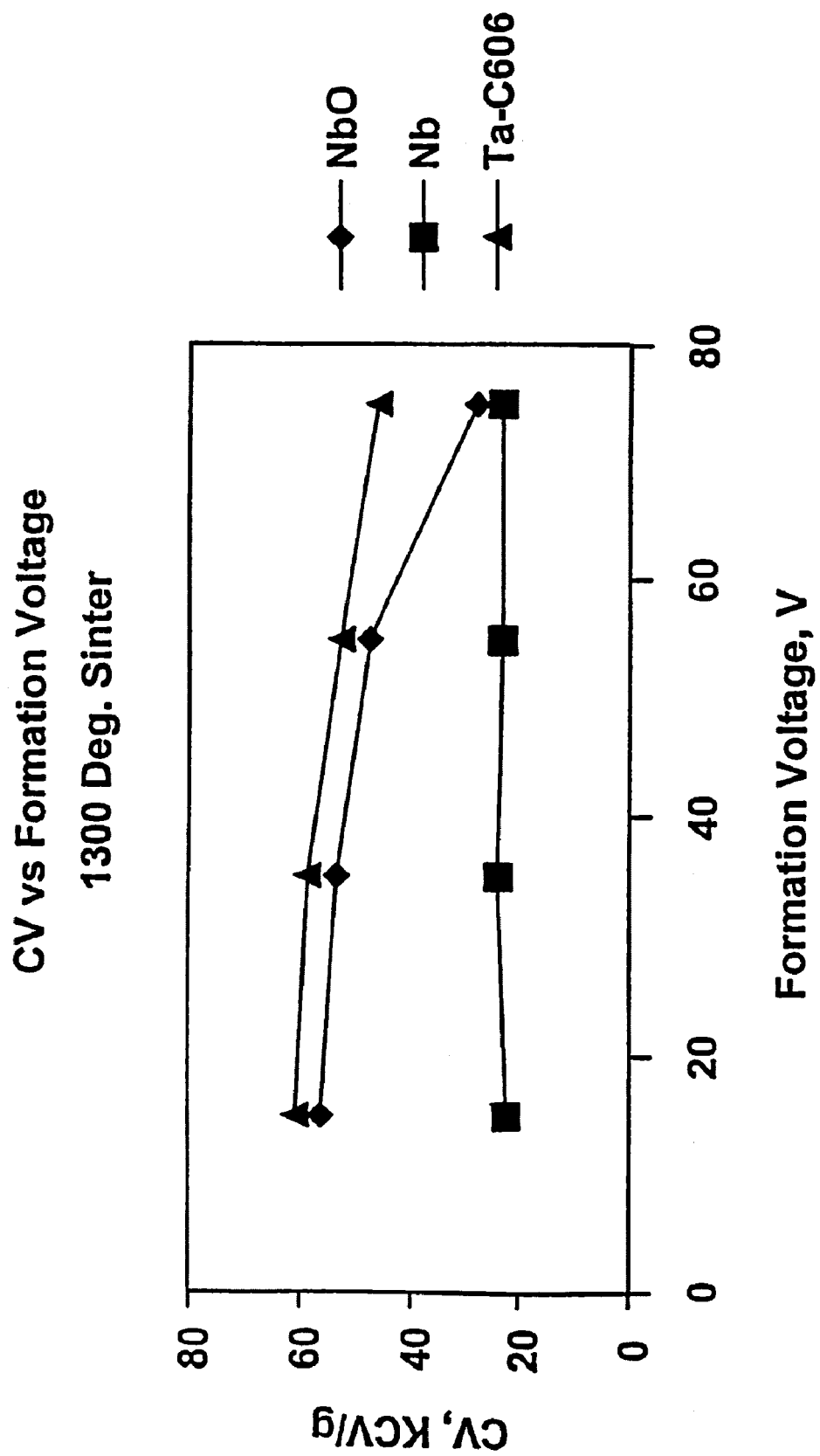
FIG. 16 is a graph showing the capacitance from a wet anodes formed from niobium oxide and tantalum.

In more detail, as shown in FIG. 3 of the present application, when anodes formed from the niobium suboxides of the present invention were tested for DC leakage, the DC leakage was below 10 nA/CV for formation voltages from under 20 to over 60 volts which is quite different from anodes formed from niobium metal which show a dramatic increase in DC leakage when formation voltages exceeded 50 volts. Further, as shown in FIG. 16, the capacitance from a wet anode formed from niobium oxide was comparable to tantalum at formation voltages of from 20 to 60 volts. These tests and FIGS. 15 and 16 show that the niobium suboxides can be formed into anodes and be used in capacitors rated up to 20 volts unlike capacitors using niobium metal which are rated below 10 volts.

Figure 17:
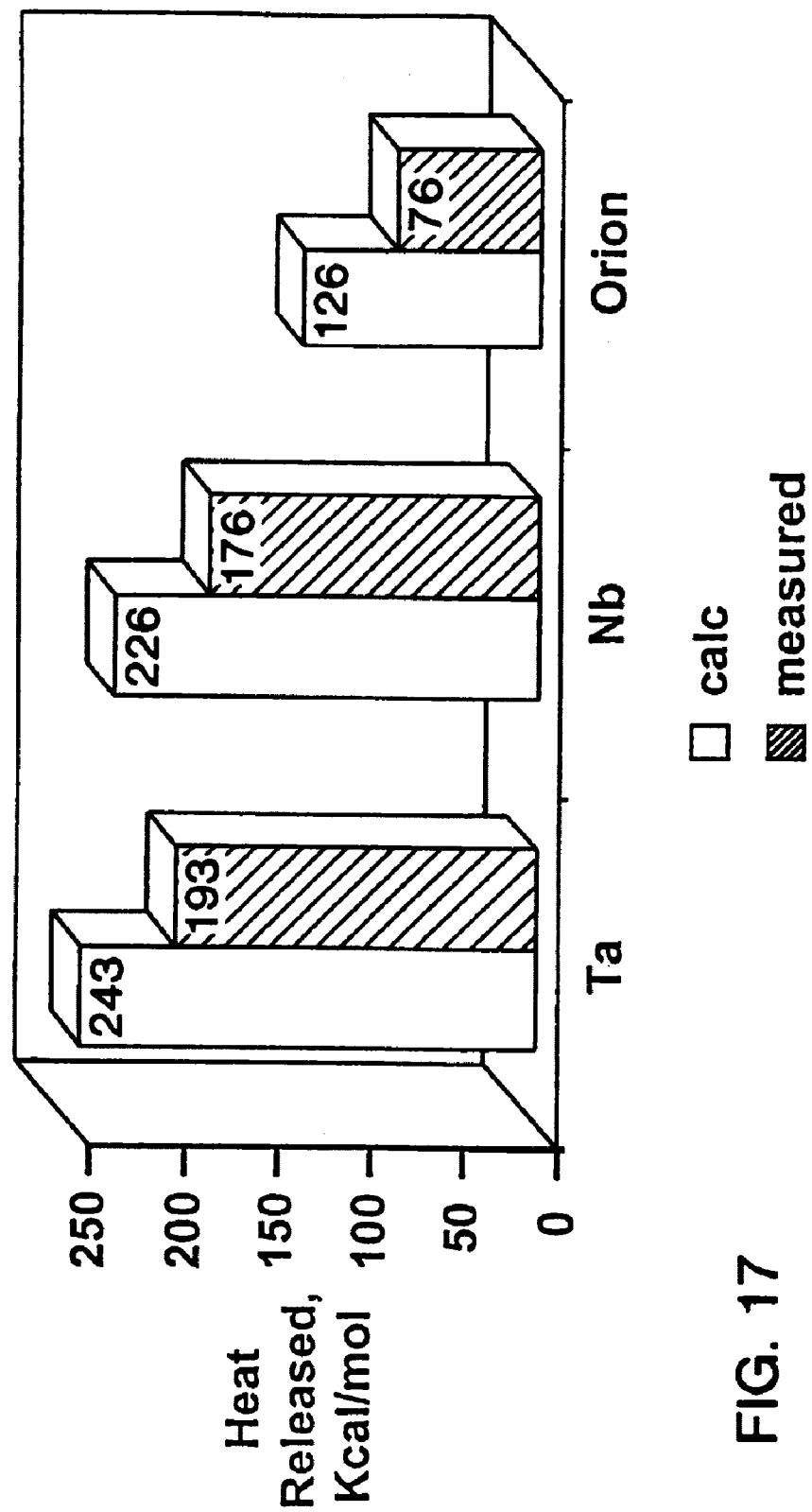
FIGS. 17 and 18 are graphs showing the flammability of anodes from niobium, tantalum, and niobium oxide.
Figure 18:
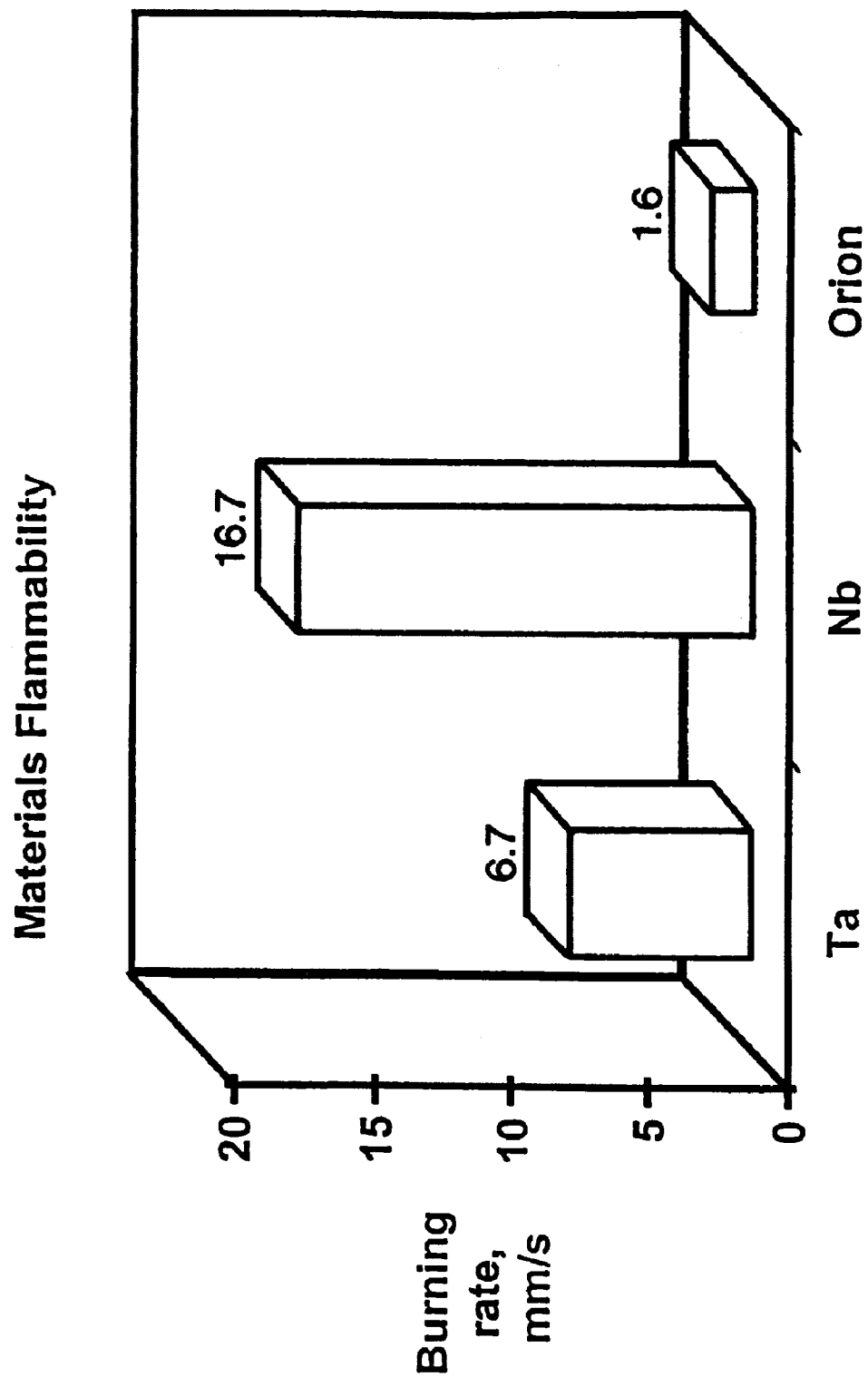
Figure 19:
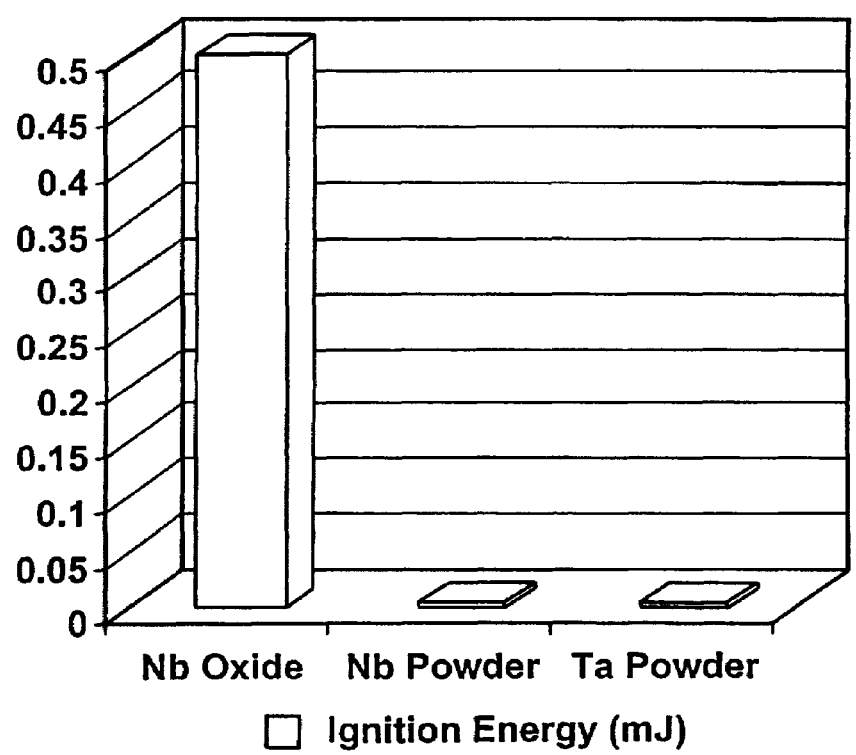
FIG. 19 is a graph showing the ignition energy needed to ignite niobium oxide powders compared to niobium powders and tantalum powders.

In addition, as shown in FIGS. 17 and 18, anodes formed from niobium suboxides are far less flammable than anodes formed from niobium or tantalum. As FIG. 17 shows, the heat released from an anode formed from the niobium suboxides of the present invention is considerably lower with regard to heat released at 500° C. than tantalum and niobium anodes. Furthermore, the flammability of the niobiums of oxides of the present invention is significantly lower than the flammability or burning rate of tantalum or niobium, as shown in FIG. 18. The burning rate is determined by Reference Test EEC Directive 79/831 ANNEX Part A from Chilworth Technology Inc. Also, the ignition energy (mJ) needed to ignite niobium oxide powders is significantly higher than the ignition energy needed to ignite niobium powder or tantalum powder as shown in FIG. 19. From such data, the niobium oxide of the present invention did not ignite at 500 mJ but ignited at an energy level of 10J (a significantly higher amount of energy). On the other hand, both niobium and tantalum powders ignited at less than 3 mJ.

The capacitor anodes of the present invention, which contain the niobium suboxides of the present invention are preferably prepared by pressing niobium oxide powder into the shape of a capacitor anode and sintering the anode at a temperature of from about 1200° C. to about 1600° C. for a time of from about 1 minute to about 30 minutes. Afterwards, the anode is then anodized at a formation voltage of from about 16 volts to about 75 volts preferably at a formation temperature of about 85° C. Other formation temperatures can be used such as from 50° C. to 100° C. Afterwards, the anode is then annealed at an annealing temperature of from about 300° C. to about 350° C. for a time of from about 10 minutes to about 60 minutes. Once this annealing is completed, the anode is again anodized at the same or slightly lower (5–10% lower) formation voltage than it is exposed to. The second formation lasts from about 10 minutes to 120 minutes at about 85° C. The anode is then preferably manganized at a temperature of from about 220° C. to about 280° C. for a time of from about 1 minute to about 30 minutes.

The present invention further relates to methods to at least partially reduce a niobium oxide. Preferably, the method involves heat treating a starting niobium oxide in the presence of a getter material in an atmosphere which permits the transfer of oxygen atoms from the starting niobium oxide to the getter material for a sufficient time and a sufficient temperature to form an oxygen reduced niobium oxide. Preferably, the oxygen reduced niobium oxide is NbO, depleted NbO, or a niobium metal with NbO. As stated earlier, preferably the getter material is a niobium metal and more preferably a niobium powder. In the preferred process, the getter material converts to the oxygen reduced niobium oxide as well. Thus, the getter material also forms part of the final product.

The present invention will be further clarified by the following examples, which are intended to be exemplary of the present invention.

---

TEST METHODS

Anode Fabrication:

size - 0.197" dia
3.5 Dp
powder wt = 341 mg
Anode Sintering:

1300° C. 10'
1450° C. 10'
1600° C. 10'
1750° C. 10'
30 V Ef Anodization

30 V Ef @ 60° C./0.1% $H_3PO_4$ Electrolyte
20 mA/g constant current
DC Leakage/Capacitance - ESR Testing:

DC Leakage Testing -
70% Ef(21 VDC) Test Voltage
60 second charge time
10% $H_3PO_4$ @ 21° C.
Capacitance - DF Testing:
18% $H_2SO_4$ @ 21° C.
120 Hz
50 V Ef Reform Anodization 50 V Ef @ 60° C./0.1% $H_3PO_4$ Electrolyte
20 mA/g constant current
DC Leakage/Capacitance - ESR Testing:

DC leakage Testing -
70% Ef(35 VDC) Test Voltage
60 second charge time
10% $H_3PO_4$ @ 21° C.
Capacitance - DF Testing:
18% $H_2SO_4$ @ 21° C.
120 Hz
75 V Ef Reform Anodization:

75 V Ef @ 60° C./0.1% $H_3PO_4$ Electrolyte
20 mA/g constant current
DC Leakage/Capacitance - ESR Testing:

DC leakage Testing -
70% Ef(52.5 VDC) Test Voltage
60 second charge time
10% $H_3PO_4$ @ 21° C.
Capacitance - DF Testing:
18% $H_2SO_4$ @ 21° C.
120 Hz

---

Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLES

Example 1

+10 mesh Ta hydride chips (99.2 gms) with approximately 50 ppm oxygen were mixed with 22 grams of $Nb_2O_5$ and placed into Ta trays. The trays were placed into a vacuum heat treatment furnace and heated to 1000° C. $H_2$ gas was admitted to the furnace to a pressure of +3 psi. The temperature was further ramped to 1240° C. and held for 30 minutes. The temperature was lowered to 1050° C. for 6 minutes until all $H_2$ was swept from the furnace. While still holding 1050° C., the argon gas was evacuated from the furnace until a pressure of $5 \times 10^{-4}$ torr was achieved. At this point 700 mm of argon was readmitted to the chamber and the furnace cooled to 60° C.

The material was passivated with several cyclic exposures to progressively higher partial pressures of oxygen prior to removal from the furnace as follows: The furnace was backfilled with argon to 700 mm followed by filling to one atmosphere with air. After 4 minutes the chamber was evacuated to $10^{-2}$ torr. The chamber was then backfilled to 600 mm with argon followed by air to one atmosphere and held for 4 minutes. The chamber was evacuated to $10^{-2}$ torr. The chamber was then backfilled to 400 mm argon followed by air to one atmosphere. After 4 minutes the chamber was evacuated to $10^{-2}$ torr. The chamber was them backfilled to 200 mm argon followed by air to one atmosphere and held for 4 minutes. The chamber was evacuated to $10^{-2}$ torr. The chamber was backfilled to one atmosphere with air and held for 4 minutes. The chamber was evacuated to $10^{-2}$ torr. The chamber was backfilled to one atmosphere with argon and opened to remove the sample. The powder product was separated from the tantalum chip getter by screening through a 40 mesh screen. The product was tested with the following results.

---

CV/g of pellets sintered to 1300° C. ×
10 minutes and formed to
35 volts = 81,297
nA/CV (DC leakage) = 5.0
Sintered Density of pellets = 2.7 g/cc
Scott density = 0.9 g/cc
Chemical Analysis (ppm)

| C = 70 | |
|---|---|
| $H_2$ = 56 | |
| Ti = 25 | Fe = 25 |
| Mn = 10 | Si = 25 |
| Sn = 5 | Ni = 5 |
| Cr = 10 | Al = 5 |
| Mo = 25 | Mg = 5 |
| Cu = 50 | B = 2 |
| Pb = 2 | all others < limits |

---

Example 2

Samples 1 through 20 are examples following similar steps as above with powdered $Nb_2O_5$ as indicated in the Table. For most of the examples, mesh sizes of the starting input material are set forth in the Table, for example 60/100, means smaller than 60 mesh, but larger than 100 mesh. Similarly, the screen size of some of the Ta getter is given as 14/40. The getters marked as "Ta hydride chip" are +40 mesh with no upper limit on particle size.

Sample 18 used Nb as the getter material (commercially available N200 flaked Nb powder from CPM). The getter material for sample 18 was fine grained Nb powder which was not separated from the final product. X-ray diffraction showed that some of the getter material remained as Nb, but most was converted to $NbO_{1.1}$ and NbO by the process as was the starting niobium oxide material $Nb_2O_5$.

Sample 15 was a pellet of $Nb_2O_5$, pressed to near solid density, and reacted with $H_2$ in close proximity to the Ta getter material. The process converted the solid oxide pellet into a porous slug of NbO suboxide. This slug was sintered to a sheet of Nb metal to create an anode lead connection and anodized to 35 volts using similar electrical forming procedures as used for the powder slug pellets. This sample demonstrates the unique ability of this process to make a ready to anodize slug in a single step from $Nb_2O_5$ starting material.

Figure 2:
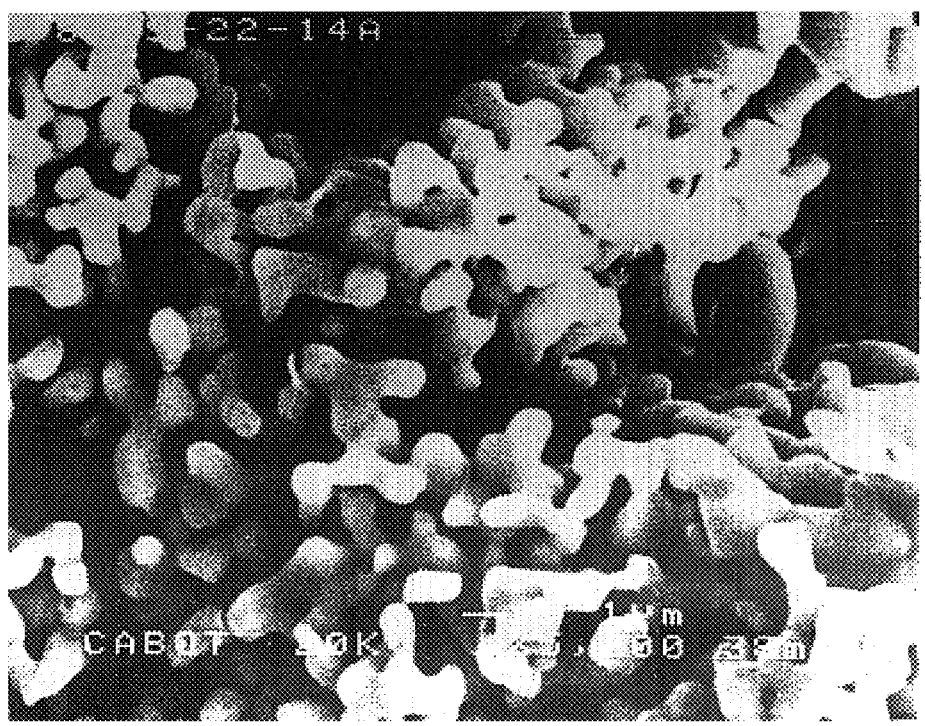
Figure 4:
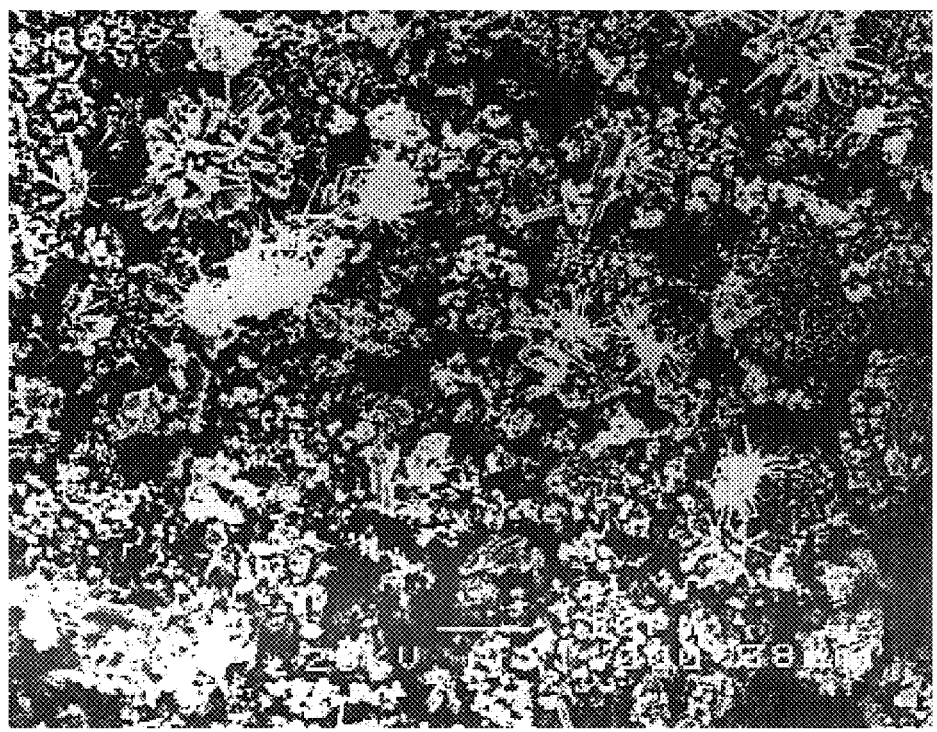
Figure 5:
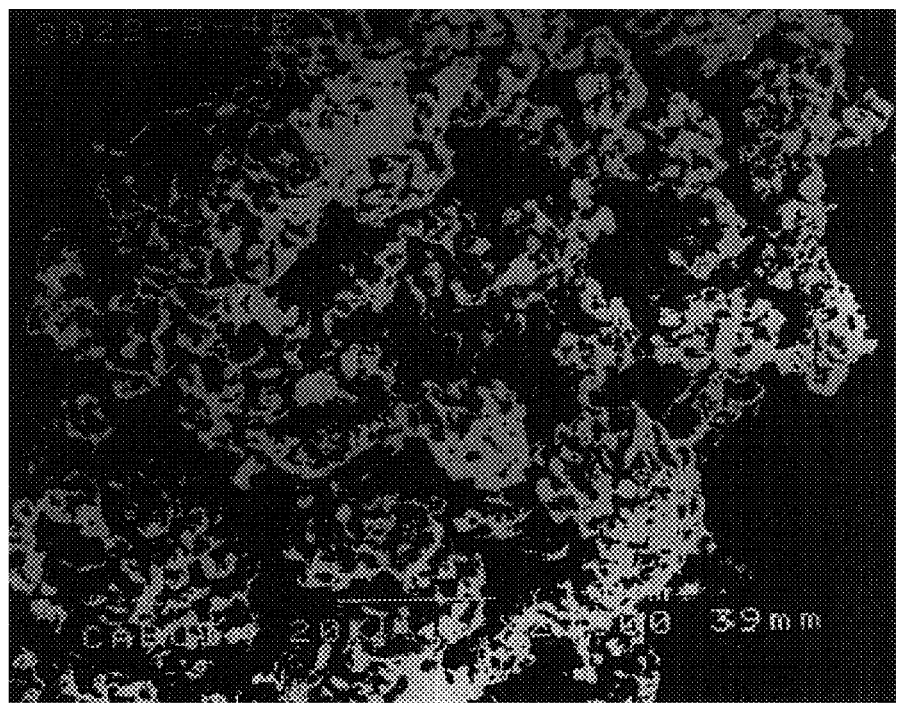
Figure 6:
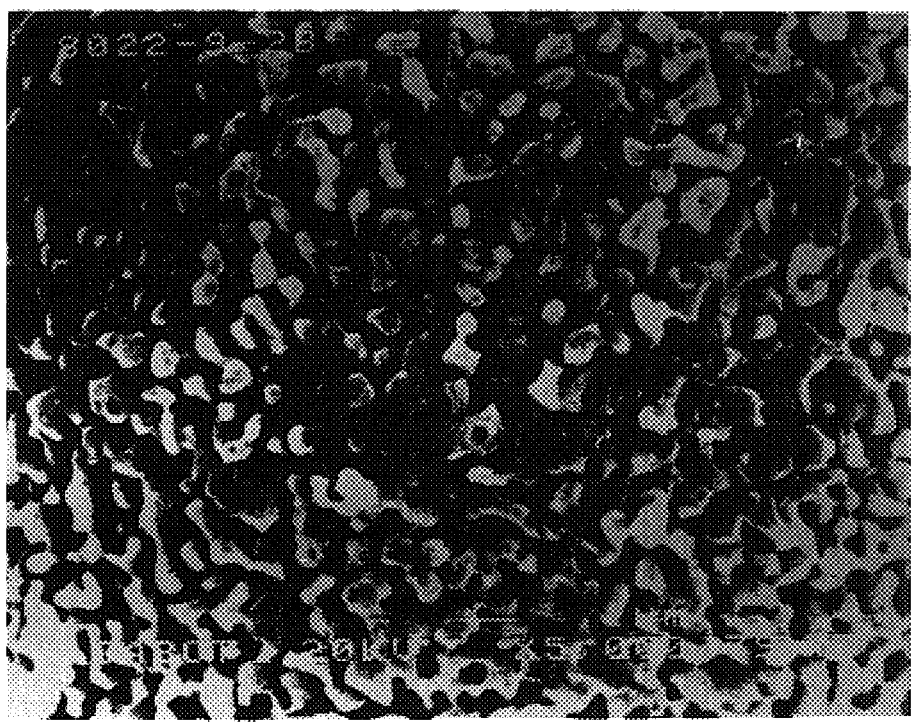
Figure 7:
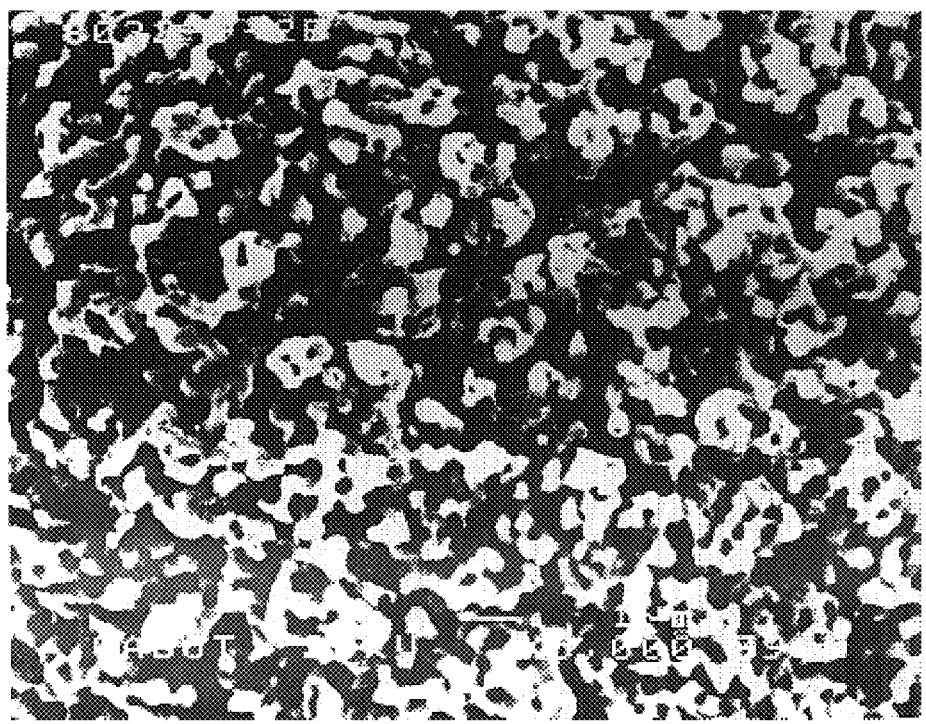
Figure 8:
Figure 9:
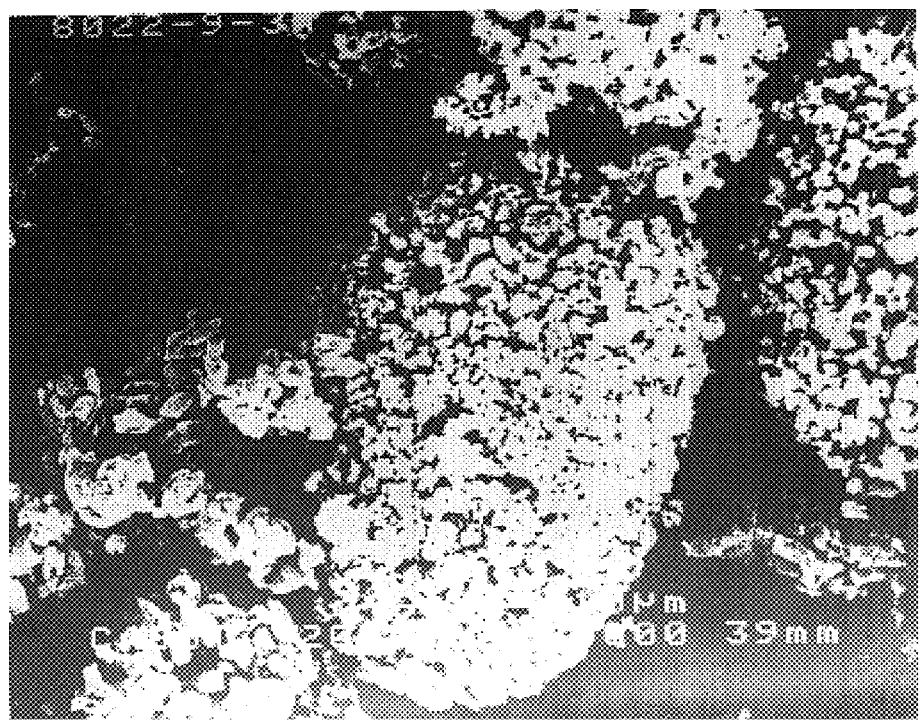
Figure 10:
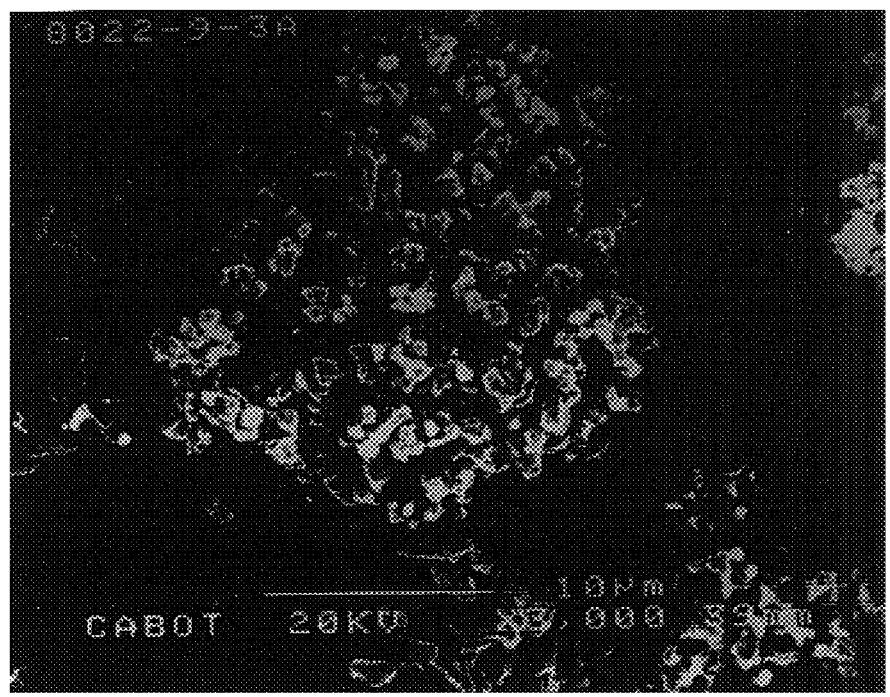
Figure 11:
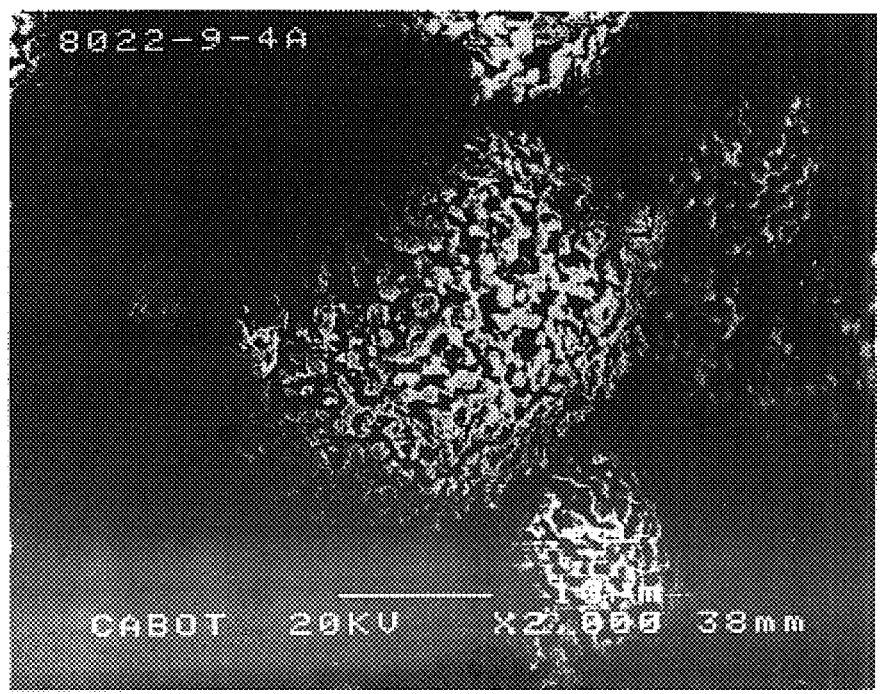

The Table shows the high capacitance and low DC leakage capable of anodes made from the pressed and sintered powders/pellets of the present invention. Microphotographs (SEMs) of various samples were taken. These photographs show the porous structure of the reduced oxygen niobium oxide of the present invention. In particular, FIG. 1 is a photograph of the outer surface of a pellet taken at 5,000× (sample 15). FIG. 2 is a photograph of the pellet interior of the same pellet taken at 5,000×. FIGS. 3 and 4 are photographs of the outer surface of the same pellet at 1,000×. FIG. 5 is a photograph of sample 11 at 2,000× and FIGS. 6 and 7 are photographs taken of sample 4 at 5,000×. FIG. 8 is a photograph taken of sample 3 at 2,000× and FIG. 9 is a photograph of sample 6 at 2,000×. Finally, FIG. 10 is a photograph of sample 6, taken at 3,000× and FIG. 11 is a photograph of sample 9 taken at 2,000×.

This experiment was conducted to show the ability of the niobium oxides of the present invention to form at high formation voltages and yet retain an acceptable DC leakage. The niobium oxide of the present invention was compared to a capacitor formed from commercially available tantalum and niobium metal. In particular, Table 2 sets forth the basic characteristics of the materials that were used to form the capacitor for this example. The C606 tantalum is a commercially available product from Cabot Corporation. The niobium oxide used in Example 3 was prepared in manner similar to Example 1. Table 3 further set forth the chemical compositions of components other than the niobium metal for the niobium oxide of the present invention and the niobium metal which was used for comparison purposes. Tables 4–7 set forth the data obtained for each formation voltage starting at 15 volts and ending at 75 volts. The data is also plotted in FIG. 12. The particular capacitor anodes which were tested for DC leakage were formed using the stated formation voltage and in each case the sintering temperature was 1300° C. for 10 minutes and the formation temperature of the anode was 60° C. with the press density set forth in Table 2. Further, the anodes were formed in 0.1% $H_3PO_4$ electrolyte, with a 135 milliamps/g constant current up to the desired formation voltage which was held for 3 hours. The test conditions were the same as for the DC leakage tested in Example 1 (except as noted herein) including 10% $H_3PO_4$ at 21° C. The anode size of the Nb suboxide was 0.17 inch diameter. The anode size of the tantalum was 0.13 inch diameter and the anode size for the niobium was

TABLE 1

| Sample | Input Material | Gms | Input Getter | Gms | Temp (° C.) | Time (min) | Hydrogen Pressure | XRD* Major 1** | XRD* Major 2** | XRD* Minor 1*** | XRD* Minor 2*** | 1300X35v CV/g | 1300X35v na/CV |
|---|---|---|---|---|---|---|---|---|---|---|---|---|---|
| 1 | −40 mesh calcined $Nb_2O_5$ | 20 (est) | Ta hydride chips | 40 (est) | 1240 | 30 | 3 psi | | | | | 81297 | 5 |
| 2 | 60/100 $Nb_2O_5$ | 23.4 | Ta hydride chips | 65.4 | 1250 | 30 | 3 psi | $NbO_{1.1}$ | NbO | TaO | | 115379 | 1.28 |
| 3 | 60/100 $Nb_2O_5$ | 23.4 | Ta hydride chips | 65.4 | 1250 | 30 | 3 psi | $NbO_{1.1}$ | NbO | TaO | | 121293 | 2.19 |
| 4 | 100/325 $Nb_2O_5$ | 32.3 | Ta hydride chips | 92.8 | 1250 | 30 | 3 psi | | | | | 113067 | 1.02 |
| 5 | 100/325 $Nb_2O_5$ | 32.3 | Ta hydride chips | 92.8 | 1250 | 30 | 3 psi | | | | | 145589 | 1.42 |
| 6 | 60/100 $Nb_2O_5$ | 26.124 | Ta hydride chips | 72.349 | 1250 | 90 | 3 psi | | | | | 17793 | 12.86 |
| 7 | 60/100 $Nb_2O_5$ | 26.124 | Ta hydride chips | 72.349 | 1250 | 90 | 3 psi | | | | | 41525 | 5.63 |
| 8 | 200/325 $Nb_2O_5$ | 29.496 | Ta hydride chips | 83.415 | 1250 | 90 | 3 psi | | | | | 17790 | 16.77 |
| 9 | 60/100 $Nb_2O_5$ | 20.888 | Ta hydride chips | 60.767 | 1200 | 90 | 3 psi | $NbO_{1.1}$ | NbO | $Ta_2O_5$ | | 63257 | 5.17 |
| 10 | 60/100 $Nb_2O_5$ | 20.888 | Ta hydride chips | 60.767 | 1200 | 90 | 3 psi | $NbO_{1.1}$ | NbO | $Ta_2O_5$ | | 69881 | 5.5 |
| 11 | 200/325 $Nb_2O_5$ | 23.936 | Ta hydride chips | 69.266 | 1200 | 90 | 3 psi | $NbO_{1.1}$ | NbO | $Ta_2O_5$ | | 61716 | 6.65 |
| 12 | 200/325 $Nb_2O_5$ | 23.936 | Ta hydride chips | 69.266 | 1200 | 90 | 3 psi | $NbO_{1.1}$ | NbO | $Ta_2O_5$ | | 68245 | 6.84 |
| 13 | 200/325 $Nb_2O_5$ | 15.5 | 14/40 Ta hydride | 41.56 | 1250 | 30 | 3 psi | $NbO_{0.7}$ | NbO | TaO | $NbO_2$ | 76294 | 4.03 |
| 14 | 200/325 Nb2O5 | 10.25 | 14/40 Ta hydride | 68.96 | 1250 | 30 | 3 psi | $NbO_{0.7}$ | NbO | TaO | $NbO_2$ | 29281 | 21.03 |
| 15 | $Nb_2O_5$ pellets | 3.49 | 14/40 Ta hydride | 25.7 | 1250 | 30 | 3 psi | | | | | 70840 | 0.97 |
| 16 | 200/325 $Nb_2O_5$ | 13.2 | 14/40 Ta hydride | 85.7 | 1200 | 30 | 3 psi | $NbO_2$ | $NbO_{0.7}$ | TaO | NbO | 5520 | 34.33 |
| 17 | 200/325 $Nb_2O_5$ | 14.94 | 14/40 Ta hydride | 41.37 | 1200 | 30 | 3 psi | | | | | 6719 | 38.44 |
| 18 | 200/325 $Nb_2O_5$ | 11.92 | N200 Nb powder | 21.07 | 1200 | 30 | 3 psi | Nb | $NbO_{1.1}$ | NbO | | 25716 | 4.71 |
| 19 | 200/325 $Nb_2O_5$ | 10 | 14/40 Ta hydride | 69 | 1250 | 30 | 100 Torr | | | | | 108478 | 1.95 |
| 20 | 200/325 $Nb_2O_5$ | 16 | 14/40 Ta hydride | 41 | 1250 | 30 | 100 Torr | | | | | 106046 | 1.66 |

*X-Ray Defraction Analysis Results
**Major 1 and 2 refer to primary components present by weight.
***Minor 1 and 2 refer to secondary components present by weight.
Samples 11 and 12 had the same input material. Samples 2 and 3 had the same input material.
Samples 6 and 7 had the same input material. Samples 9 and 10 had the same input material.

Example 3

0.19 inch diameter. The anode weight was as follows: niobium suboxide=200 mg; tantalum=200 mg; niobium=340 mg.

TABLE 2

|  | Nb Sub-Oxide | Nb | Ta C606 (Commercial product) |
| --- | --- | --- | --- |
| BET, $m^2/g$ | 0.75 | 0.58 | Commercial spec |
| Scott density, $g/in^2$ | 20.7 | 23.8 | Commercial spec |
| Anode sintering density, g/cc | 3.0 | 4.1 | 5.3 |
| CV/g | 56.562 | 22,898 | 61,002 |
| Sintering conditions | 10 min @ 1300° C. | 10 min @ 1300° C. | 10 min @ 1300° C. |
| Formation temperature | 60° C. | 60° C. | 60° C. |

TABLE 3

| Element | Nb Oxide | Nb |
| --- | --- | --- |
| C | 150 | 422 |
| O | 141,400 | 2399 |
| H |  | 55 |
| Si | 30 | 250 |
| Ni | 10 | 20 |
| Fe | 200 | 100 |
| Cr | 40 | 50 |
| Ti | <5 | <5 |
| Mn | 25 | 25 |
| Sn | <5 | <5 |
| Ca | <50 | <50 |
| Al | 50 | 20 |
| W | <100 | <100 |
| Zr | <5 | <5 |
| Mg | 25 | 10 |
| B | <5 | 10 |
| Co | <5 | <5 |
| Cu | <5 | 10 |

Figure 12:
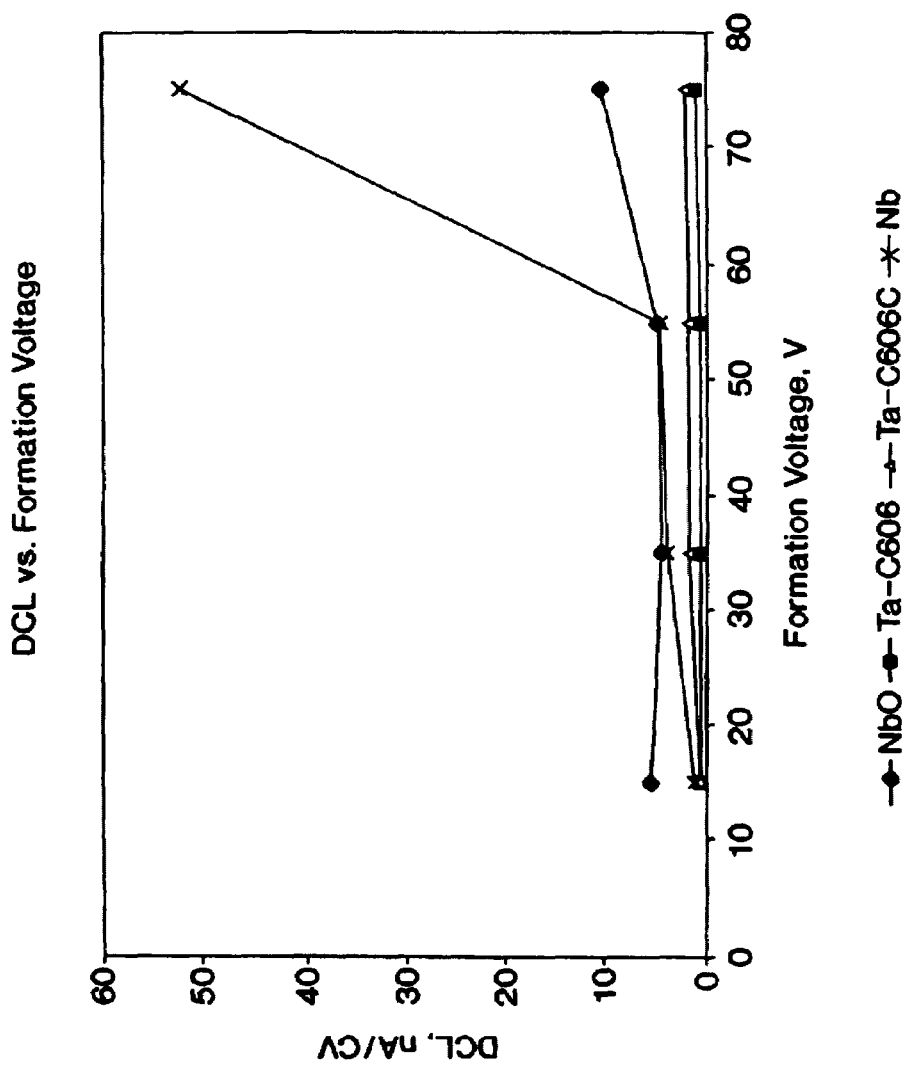
FIG. 12 is a graph plotting DC leakage vs. Formation voltage for a niobium oxide capacitor anode and other anodes made from niobium or tantalum.

As can be seen in FIG. 12 and Tables 4–7, while the DC leakage for capacitor anodes made from niobium metal increased dramatically at a formation voltage of 75 volts, the DC leakage for the capacitor anode formed from a niobium oxide of the present invention remain relatively stable. This is quite impressive considering the effect seen with respect to a capacitor anode formed from niobium metal. Thus, unlike niobium metal, the niobium oxides of the present invention have the ability to be formed into capacitor anodes and formed at high voltages while maintaining acceptable DC leakage which was not possible with anodes made simply from niobium metal. Thus, the niobium oxides of the present invention can be possible substitutes for anodes made from tantalum in certain applications which is quite beneficial considering niobium can be less expensive.

TABLE 4

|  | Nb Sub-Oxide | Ta | Ta | Nb |
| --- | --- | --- | --- | --- |
| Anodization Voltage | 15.0 | 15.0 | 15.0 | 15.0 |
| (CV) | 11,037 | 13,095 | 12,635 | 7,893 |
| (CV/g) | 56,562 | 63,154 | 61,002 | 22,898 |
| (CV/g) (Corr) |  |  |  |  |
| (CV/cc) | 168,304 | 352,254 | 324,448 | 93,372 |
| (Ohms) | 0.82 | 0.92 | 0.90 | 0.89 |
| Charge time one (sec) | 30 | 30 | 30 | 30 |
| (uA) | 72.86 | 10.94 | 12.74 | 13.14 |
| *"FLIERS" | 0 | 0 | 0 | 0 |
| "GASSERS" | 0 | 0 | 0 | 0 |
| N = | 8 | 8 | 8 | 2 |
| (uA/g) | 373.37 | 52.75 | 61.51 | 38.12 |
| (nA/CV) | 6.60 | 0.84 | 1.01 | 1.66 |
| Charge time two (sec) | 60 | 60 | 60 | 60 |
| (uA) | 60.08 | 7.39 | 9.00 | 9.42 |
| "FLIERS" | 0 | 0 | 0 | 0 |
| "GASSERS" | 0 | 0 | 0 | 0 |
| N = | 8 | 8 | 8 | 2 |
| (uA/g) | 307.90 | 35.63 | 43.45 | 27.31 |
| (nA/CV) | 5.44 | 0.56 | 0.71 | 1.19 |
| Dia. Shkg (%) | 0.6 | 0.6 | −1.2 | 4.0 |
| Ds(g/cc) | 3.0 | 5.6 | 5.3 | 4.1 |

TABLE 5

|  | Nb Sub-Oxide | Ta | Ta | Nb |
| --- | --- | --- | --- | --- |
| Anodization Voltage | 35.0 | 35.0 | 35.0 | 35.0 |
| (CV) | 10,445 | 12,678 | 12,130 | 7,977 |
| (CV/g) | 53,107 | 60,470 | 58,448 | 23,457 |
| (CV/g) (Corr) |  |  |  |  |
| (CV/cc) | 158,416 | 341,045 | 311,482 | 93,700 |
| (Ohms) | 0.92 | 1.04 | 1.02 | 0.95 |
| Charge time one (sec) | 30 | 30 | 30 | 30 |

TABLE 5-continued

|  | Nb Sub-Oxide | Ta | Ta | Nb |
|---|---|---|---|---|
| (uA) | 54.13 | 11.50 | 29.60 | 53.31 |
| *"FLIERS" | 0 | 1 | 0 | 0 |
| "GASSERS" | 0 | 0 | 0 | 0 |
| N = | 8 | 8 | 8 | 2 |
| (uA/g) | 275.23 | 54.86 | 142.64 | 156.77 |
| (nA/CV) | 5.18 | 0.91 | 2.44 | 6.68 |
| Charge time two (sec) | 60 | 60 | 60 | 60 |
| (uA) | 47.21 | 7.56 | 20.99 | 31.17 |
| "FLIERS" | 0 | 1 | 0 | 0 |
| "GASSERS" | 0 | 0 | 0 | 0 |
| N = | 8 | 8 | 8 | 2 |
| (uA/g) | 240.04 | 36.08 | 101.14 | 91.66 |
| (nA/CV) | 4.52 | 0.60 | 1.73 | 3.91 |
| Dia. Shkg (%) | 0.6 | 0.6 | −1.2 | 3.8 |
| Ds(g/cc) | 3.0 | 5.6 | 5.3 | 4.0 |

TABLE 6

|  | Nb Sub-Oxide | Ta | Ta | Nb |
|---|---|---|---|---|
| Anodization Voltage | 55.0 | 55.0 | 55.0 | 55.0 |
| (CV) | 9,476 | 11,448 | 10,878 | 7,894 |
| (CV/g) | 47,159 | 54,928 | 52,394 | 22,941 |
| (CV/g) (Corr) |  |  |  |  |
| (CV/cc) | 134,774 | 307,960 | 279,339 | 92,880 |
| (Ohms) | 1.35 | 1.21 | 1.18 | 1.08 |
| Charge time one (sec) | 30 | 30 | 30 | 30 |
| (uA) | 53.70 | 13.48 | 28.40 | 61.61 |
| *"FLIERS" | 0 | 0 | 0 | 0 |
| "GASSERS" | 0 | 0 | 0 | 0 |
| N = | 8 | 8 | 8 | 2 |
| (uA/g) | 267.23 | 64.65 | 136.80 | 179.05 |
| (nA/CV) | 5.67 | 1.18 | 2.61 | 7.80 |
| Charge time two (sec) | 60 | 60 | 60 | 60 |
| (uA) | 46.28 | 8.91 | 20.24 | 36.29 |
| "FLIERS" | 0 | 0 | 0 | 0 |
| "GASSERS" | 0 | 0 | 0 | 0 |
| N = | 8 | 8 | 8 | 2 |
| (uA/g) | 230.34 | 42.77 | 97.50 | 105.45 |
| (nA/CV) | 4.88 | 0.78 | 1.86 | 4.60 |
| Dia. Shkg (%) | 0.3 | 0.6 | −1.2 | 3.8 |
| Ds(g/cc) | 2.9 | 5.6 | 5.3 | 4.0 |

TABLE 7

|  | Nb Sub-Oxide | Ta | Ta | Nb |
|---|---|---|---|---|
| Anodization Voltage | 75.0 | 75.0 | 75.0 | 75.0 |
| (CV) | 5,420 | 10.133 | 9.517 | 7,872 |
| (CV/g) | 27,508 | 48,484 | 45,749 | 22,886 |
| (CV/g) (Corr) |  |  |  |  |
| (CV/cc) | 80,768 | 274,194 | 246,127 | 93,954 |
| (Ohms) | 4.58 | 1.37 | 1.31 | 1.31 |
| Charge time one (sec) | 30 | 30 | 30 | 30 |
| (uA) | 67.08 | 16.76 | 27.47 | 640.50 |
| *"FLIERS" | 0 | 0 | 0 | 0 |
| "GASSERS" | 0 | 0 | 0 | 0 |
| N = | 8 | 8 | 8 | 2 |
| (uA/g) | 340.40 | 80.17 | 132.04 | 1862.19 |
| (nA/CV) | 12.37 | 1.65 | 2.89 | 81.37 |
| Charge time two (sec) | 60 | 60 | 60 | 60 |
| (uA) | 55.91 | 10.97 | 19.90 | 412.20 |
| "FLIERS" | 0 | 0 | 0 | 0 |
| "GASSERS" | 0 | 0 | 0 | 0 |
| N = | 8 | 8 | 8 | 2 |
| (uA/g) | 283.75 | 52.48 | 95.67 | 1198.43 |
| (nA/CV) | 10.32 | 1.08 | 20.9 | 52.37 |
| Dia. Shkg (%) | 0.1 | 0.9 | −0.9 | 4.3 |
| Ds(g/cc) | 2.9 | 5.7 | 5.4 | 4.14 |

Example 4-A

According to the preferred embodiment of the invention, the beginning feed stock is a high purity crushed niobium hydride screened to 40 mesh (420 microns). This feed material is milled in an Attritor mill to obtain the desired size reduction. The mill itself is lined with Nb and is outfitted with Nb arms to eliminate contamination concerns. The milling is accomplished by stirring 3/16 inch Nb balls in water then adding the 40 mesh Nb powder to create a slurry. The slurry is stirred for a short time (5 to 10 minutes) to quickly reduce the size of the feed to around 140 mesh (~100 micron). This material is drained from the mill and separated from the 3/16 inch milling media.

Example 4-B

To test the improvement in crush strength due to milling, a broadly distributed NbO powder sample was milled to reduce the average particle size and tighten the particle distribution. The following procedure was used:

A. Post Reaction Milling

Sample 8587-48 was wet milled in an 01HD Attritor mill with 1.5 mm Nb balls for approximately 8 minutes to de-agglomerate the powder. The mill was operated at 1000 RPM. Water was used with the powder to create the slurry for milling. Once milled, the slurry and milling media were dumped from the mill and separated via screening. The slurry was allowed to settle and the excess water was removed by decanting. The remaining cake was dried, crushed and screened and assigned the sample number of 8587-48-UP1.

Crush Evaluation

Representative anodes of the resulting powder were pressed at 3.0 and 3.5 g/cc press density (Dp). Results are shown below compared to the unmilled powder.

TABLE 8

|  | Unmilled | Unmilled | Milled | Milled |
|---|---|---|---|---|
| Sample | 8587-48 @ 3.0 Dp | 8587-48 @ 3.5 Dp | 8587-48-UP1 @ 3.0 Dp | 8587-48-UP1 @ 3.5 Dp |
| Average Crush (lbs) | 0.33 | 1.13 | 2.48 | 6.91 |
|  | Pre-milled getter | | Pre-milled getter NbO milled | |

Example 5

Figure 20:
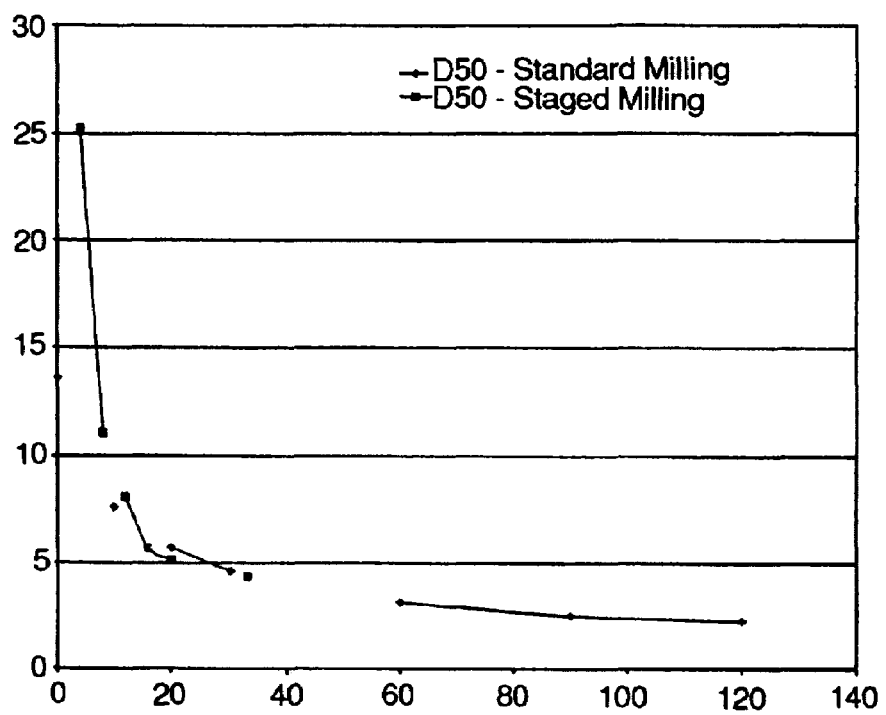
FIG. 20 is a graph showing milling time (X axis) in minutes vs. size of particle (Y axis) in microns.

To test the rate of particle size reduction and particle size distribution due to changing the milling media diameter, coarse feed was introduced to the attritor mill with larger milling media for a short period and then remilled using smaller media. The response to milling with a single ball size versus changing ball diameters is shown in FIG. 20.

Example 6

In order to reduce the contamination of the powders created according to the present invention, Nb material was subjected to the process and tested to measure the contamination level and crush strength. The following procedure was followed:

A. Size Reduction

A -200 mesh feed stock (75 micron and smaller) was milled in a Nb lined 01HD Attritor Mill using 1.5 mm Nb balls Nb stirring arms and water as the slurry fluid. The mill was operated at 1000 RPM for 20 minutes to obtain a particle distribution centered at 5.6 micron having less than 10% less than 1.7 micron and less than 10% greater than 9.5 micron. Aside from the Nb balls, the slurry was composed of ~300 ml water and ~800 grams Nb feed.

B. Powder Leaching/Drying/Screening

The slurry from step A was isolated from the milling media by screening. The slurry was allowed to settle and excess water was removed by decanting. The material was then acid leached and water washed to improve the purity and then dried and screened leaving a high purity, fine Nb powder. The resulting purity level is shown below in the table in "Step D".

C. Powder Reaction

The powder from step B was then mixed with the proper amount of Nb2O5 to create NbO. This mixture was heat treated in a hydrogen environment at 1560F for 1 hour.

D. Post Reaction Milling/Contamination Testing

The reacted powder was milled in the same Nb lined 01HD mill with Nb stirring arms and 1.5 mm Nb balls for 6 minutes. The material was then isolated, dried and screened. The screened powder evaluated for contamination levels, focusing on Fe, Ni and Cr levels, with the following results.

TABLE 9

|  | LEACHED PRIOR TO REACTION AND MILLING | | REACTED AND MILLED WITH NO FURTHER LEACHING | |
|---|---|---|---|---|
| Sample | 8651-7-46 | 8651-7-47 | 8651-7-46M | 8651-7-47M |
| Total FeNiCr | 12 ppm | 12 ppm | 36 ppm | 18 ppm |

Example 7

In this experiment, a lower sintering temperature was used to form capacitor anodes of the present invention. The powder used to form the capacitor anode was prepared by taking a niobium getter material and introducing it into an Attritor mill, more specifically a 1S mill that is operated at about 300 rpm. The wet milling occurred until the niobium getter material had a particle size of about 4 microns to about 10 microns. Afterwards, the niobium milled getter material was mixed with a starting niobium pentoxide having a particle size of about 20–30 (D-50) microns. The ratio of niobium getter material to niobium pentoxide material was at a weight ratio of about 1 to 1. The niobium pentoxide was uniformly distributed amongst the niobium getter material and then subjected to a hydrogen heat treatment at about 850° C. for about 1 hour at a hydrogen gas pressure of about 3 PSI. The material resulting from the hydrogen heat treatment was primarily NbO. This NbO material was then subjected to a wet milling process using the same type of mill operated at about 300 rpm to result in a particle size of about 4 microns.

Afterwards, the NbO powder was pressed into pellets at the particular pressed densities indicated in the table below and were sintered at the temperatures and for the times indicated in the table below. A tantalum embedded lead wire was put into the pressed anodes prior to sintering and anodizing. The sintered anodes were then anodized in the manner described below and were tested for capacitance, DC leakage, and other properties including shrinkage as set forth in the table. As can be seen in the table, the capacitor anodes of the present invention achieved a significantly high capacitance with a significantly low DC leakage and an extremely low shrinkage.

Anode Fabrication (a) Non lubed powder using the Ta .025" expanded leads
    (b) 3.5 Dp at 0.2" dia × 0.208" length
    (c) Target 3.5 Dp
    (d) Powder weight - 372 mg Anode Sintering (10'/A Ramp)

Use the NRC Furnace (use "A" ramp); N = 1 Sinter

35V Ef Anodization (a) Electrolyte; (.1% H3P04 @ 85 Deg C., @ 4.3 mmho)
    (b) Constant current density: (135 ma/g)
    (c) Terminal Voltage = 35.0 VDC +/−0.03
    (d) Terminal Voltage Time = 180 min −0/+5 min
    (e) 60 C. soak for 30 min
    (f) 60 C. oven for 120 min DC Leakage/Capacitance ESR Testing (a) DC leakage Testing
        70% Ef Test Voltage
        60, 120, and 180 second charge time
        10% H3PO4 @ 21 Deg C.
    (b) Capacitance-DF Testing
        18% H2SO4 @ 21 Deg C.
        120 Hz

TABLE 10

| | | |
|---|---|---|
| Dp (g/cc) | 3.50 | 3.50 |
| Sinter Condition (Deg. C.) | 1100 | 1100 |
| Time Held at Temperature (Min.) | 60 | 240 |
| Anodization Voltage | 35.0 | 35.0 |
| (CV) | 37,997 | 38,688 |
| (CV/g) | 103,269 | 105,418 |
| (CV/cc) | 357,098 | 369,424 |
| (Ohms) | 0.96 | 0.93 |
| Charge time one (sec) | 60 | 60 |
| (uA) | 29.85 | 11.98 |
| (uA/g) | 81.13 | 32.65 |
| (nA/CV) | 0.79 | 0.31 |
| Charge time two (sec) | 120 | 120 |
| (uA) | 24.96 | 8.83 |
| (uA/g) | 67.84 | |
| (nA/CV) | 0.66 | |
| Charge time three (sec) | 180 | 180 |
| (uA) | 23.18 | 8.65 |
| (uA/g) | 62.99 | 23.56 |
| (nA/CV) | 0.61 | 0.22 |
| Dia. Shkg (%) | −0.25 | 0.25 |
| Ds (g/cc) | 3.46 | 3.50 |

Example 8

In this experiment, a sintering temperature of 1200C was used to form the capacitor anodes of the present invention. The powder used to form the capacitor anode was prepared by taking niobium getter material and introducing it into a 1S Attritor mill that was operated at between 300 and 500 rpm. The material was first wet milled in tetraethylene glycol to create a flake-like shape. Next it was washed and wet milled in water for between 1 and 2 hours. The milled Nb powder was then heat treated in a vacuum furnace between 900C and 1200C. The resulting material was crush and screened to less than 40 US Mesh. No $Nb_2O_5$ was used.

Afterwards, the Nb powder was pressed into pellets at particular press densities indicated in the table below and the pellets were sintered at the times and temperatures in the table below. A tantalum embedded lead wire was put into the pressed anodes prior to sintering and anodizing. The sintered anodes were then anodized in the manner described below and were tested for capacitance, DC leakage, and other properties including shrinkage as set forth in the table. As can be seen in the table, the capacitor anodes made from oxygen rich niobium metal (20,000–30,000 ppm oxygen) achieved a useable capacitance, DC leakage, and shrinkage.

Anode Fabrication:

(a) Non lubed powder using the Ta .025" expanded leads
    (b) 3.2 Dp at 0.2" dia × 0.208" length
    (c) Target 3.2 Dp Powder weight 338 mg Anode Sintering (10'/A Ramp):

Use the NRC Furnace (use "A" ramp); N = 1 Sinter
    (a) 1200 Deg C. × 10 min

35V Ef Anodization:

(1) One Formation
    (2) Electrolyte; (.1% H3PO4 @ 85 Deg C., @ 4.3 mmho)
    (3) Constant current density: (135 ma/g)
    (4) Terminal Voltage = 35.0 VDC +/− 0.03
    (5) Terminal Voltage Time = 180 min −0/+5 min
    (6) 60 C. soak for 30 min
    (7) 60 C. oven for 120 min DC Leakage/Capacitance-ESR Testing:

(a) DC Leakage Testing
        70% Ef Test Voltage
        60, 120, and 180 second charge time
        10% H3PO4 @ 21 Deg C.
    (b) Capacitance-DF Testing:
        18% H2SO4 @ 21 Deg C.
        120 Hz
        Bias @ 2.5 vdc

TABLE 11

| Sample | 1 | 2 |
|---|---|---|
| Dp (g/cc) | 3.2 | 3.2 |
| Oxygen (ppm) | 24,993 | 30,535 |
| (CV) | 16,090 | 15,581 |
| (CV/g) | 47,509 | 46,153 |
| (CV/cc) | 151,178 | 147,307 |
| (Ohms) | 0.66 | 0.66 |
| Charge time one (sec) | 60 | 60 |
| (uA) | 21.48 | 18.68 |
| (uA/g) | 63.42 | 55.33 |
| (nA/CV) | 1.33 | 1.20 |
| Charge time two (sec) | 120 | 120 |
| (uA) | 18.21 | 16.56 |
| (uA/g) | 53.76 | 49.04 |
| (nA/CV) | 1.13 | 1.06 |
| Charge time three (sec) | 180 | 180 |
| (uA) | 17.09 | 16.16 |

TABLE 11-continued

| Sample | 1 | 2 |
|---|---|---|
| (uA/g) | 50.45 | 47.87 |
| (nA/CV) | 1.06 | 1.04 |
| Dia. Shkg (%) | 0.61 | 0.89 |
| Ds (g/cc) | 3.18 | 3.19 |

Example 9

In this experiment, a sintering temperature of 1400C was used to form the capacitor anodes of the present invention. The powder used to form the capacitor anode was prepared by taking niobium getter material and introducing it into a 1S Attritor mill that is operated at between 300 and 500 rpm. The niobium material was wet milled at about 300 rpm for 30 minutes to a particle size of about 4 microns to 10 microns. Afterwards, the milled niobium getter was mixed with a niobium pentoxide having a particle size of about 20 microns to 30 microns. The ratio of niobium getter material to niobium pentoxide material was at a weight ratio of about 1 to 1. The niobium pentoxide material was uniformly distributed amongst the niobium getter material then subjected to a hydrogen heat treatment at about 850C for 1 hour at a hydrogen gas pressure of about 3 PSI. The material resulting from the hydrogen heat treatment was primarily NbO. This material was screened to less than 40 US Mesh.

Afterwards, the NbO powder was pressed into pellets at particular press densities indicated in the table below and the pellets were sintered at the times and temperatures in the table below. A tantalum embedded lead wire was put into the pressed anodes prior to sintering and anodizing. The sintered anodes were then anodized in the manner described below and were tested for capacitance, DC leakage, and other properties including shrinkage as set forth in the table. As can be seen in the table, the capacitor anodes achieved a high capacitance with extremely low DC leakage.

Anode Fabrication:

(a) Non lubed powder using the Ta .025" expanded leads
    (b) 3.2 Dp at 0.2" dia × 0.208" length
    (c) Target 3.2 Dp Powder weight 338 mg Anode Sintering (10'/A Ramp):

Use the NRC Furnace (use "A" ramp); N = 1 Sinter
    (b) 1400 Deg C. × 10 min

35V Ef Anodization:

(1) One Formation
    (2) Electrolyte; (.1% H3PO4 @ 85 Deg C., @ 4.3 mmho)
    (3) Constant current density: (135 ma/g)
    (4) Terminal Voltage = 35.0 VDC +/− 0.03
    (5) Terminal Voltage Time 180 min −0/+5 min
    (6) 60 C. soak for 30 min
    (7) 60 C. oven for 120 min DC Leakage/Capacitance-ESR Testing (a) DC Leakage Testing
        70% Ef Test Voltage
        60, 120, and 180 second charge time
        10% H3PO4 @ 21 Deg C.
    (b) Capacitance-DF Testing:
        18% H2SO4 @ 21 Deg C.
        120 Hz
        Bias @ 2.5 vdc

TABLE 12

| Sample | 1 | 2 |
|---|---|---|
| Dp (g/cc) | 3.2 | 3.2 |
| (CV) | 26,556 | 25,687 |
| (CV/g) | 71,874 | 69,178 |
| (CV/cc) | 288,552 | 261,283 |
| (Ohms) | 1.07 | 0.95 |
| Charge time one (sec) | 60 | 60 |
| (uA) | 7.08 | 7.52 |
| (uA/g) | 19.17 | 20.24 |
| (nA/CV) | 0.27 | 0.29 |
| Charge time two (sec) | 120 | 120 |
| (uA) | 4.57 | 4.74 |
| (uA/g) | 12.37 | 12.76 |
| (nA/CV) | 0.17 | 0.18 |
| Charge time three (sec) | 180 | 180 |
| (uA) | 3.63 | 3.70 |
| (uA/g) | 9.84 | 9.96 |
| (nA/CV) | 0.14 | 0.14 |
| Dia. Shkg (%) | 4.66 | 2.16 |
| Ds (g/cc) | 4.01 | 3.78 |

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of forming a capacitor anode comprising a niobium oxide having an atomic ratio of niobium to oxygen of 1:less than 2.5, comprising forming said niobium oxide into the shape of an anode and sintering at a temperature of from about 800° C. to about 1200° C. for a time of from about 1 hour to about 10 hours;
   anodizing at from about 16 to about 75 volts at a formation temperature of about 85° C.;
   annealing said anode at a temperature of from about 300 to about 350° C. for a time of from about 10 minutes to about 60 minutes; and
   manganizing said anode at a temperature of from about 220° to 280° C.

2. A method of forming a capacitor anode comprising a niobium oxide having an atomic ratio of niobium to oxygen of 1:less than 2.5, comprising forming said niobium oxide into the shape of an anode and sintering at a temperature of from about 800° C. to about 1200° C. for a time sufficient to form a capacitor anode.

3. The method of claim 2, wherein said time is from about 1 hour or less to about 10 hours or more.

4. The method of claim 2, wherein said time is from about 1 hour to about 4 hours.

5. The method of claim 2, wherein in said sintering temperature is from about 900° to about 1200° C.

6. The method of claim 2, wherein in said sintering temperature is from about 1000° to about 1100° C.

7. A method to achieve low shrinkage of a capacitor anode comprising forming a capacitor anode comprising a niobium oxide having an atomic ratio of niobium to oxygen 1: less than 2.5, comprising forming said niobium oxide into the shape of an anode and sintering at a temperature of from about 800° C. to about 1200° C. for a sufficient time to form a capacitor anode having capacitance.

8. The method of claim 2, wherein said time is 1 day or more.

* * * * *